United States Patent
La Forest et al.

(10) Patent No.: US 8,721,954 B2
(45) Date of Patent: May 13, 2014

(54) TECHNIQUES FOR PITCH DENSIFICATION

(71) Applicant: Honeywell International Inc., Morristown, NJ (US)

(72) Inventors: Mark L. La Forest, Granger, IN (US); Roger L. Klinedinst, North Liberty, IN (US); David M. Wright, Springfield, MA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/801,229

(22) Filed: Mar. 13, 2013

(65) Prior Publication Data

US 2013/0193606 A1 Aug. 1, 2013

Related U.S. Application Data

(62) Division of application No. 12/938,201, filed on Nov. 2, 2010, now abandoned.

(51) Int. Cl.
*B29C 70/34* (2006.01)

(52) U.S. Cl.
USPC ........ 264/328.5; 264/553; 264/570; 264/571; 264/29.1; 264/29.5; 264/259; 264/279; 264/328.4; 425/503; 425/504; 425/544; 425/546; 425/DIG. 228

(58) Field of Classification Search
USPC ........ 264/553, 570, 571, 29.1, 29.5, 259.279, 264/328.4, 328.5; 425/503, 504, 544, 546, 425/DIG. 228
See application file for complete search history.

(56) References Cited

U.S. PATENT DOCUMENTS

| 3,028,284 A | 4/1962 | Reeves |
| 3,596,314 A | 8/1971 | Krugler |

(Continued)

FOREIGN PATENT DOCUMENTS

| EP | 1 724 245 A1 | 11/2006 |
| EP | 1 731 292 A2 | 12/2006 |

(Continued)

OTHER PUBLICATIONS

Fatz et al., "Manufacture of Functionally Gradient Carbon-Carbon Composites", Proceedings of the 17th Technical Conference of the American Society of Composites, Oct. 21-23, 2002, Purdue University, West Lafayette, Ind., 9 pages.

(Continued)

*Primary Examiner* — Joseph S Del Sole
*Assistant Examiner* — Lawrence D Hohenbrink, Jr.
(74) *Attorney, Agent, or Firm* — Shumaker & Sieffert, P.A.

(57) ABSTRACT

In some examples, a method for densifying a material via pitch comprises inserting the material to be densified into a mold, wherein the mold is part of an apparatus. The apparatus may include a ram configured to apply a ram pressure sufficient to force a pitch into the mold to densify the material, a gas source configured to apply a gas pressure sufficient to force the pitch into the mold to densify the material, and a vacuum source operable to create a vacuum pressure in the mold at least prior to application of either the ram pressure or the gas pressure. The method may further comprise densifying the material in the mold via pitch using a selectable one of the ram, the gas source, the ram and the vacuum source, or the gas source and the vacuum source.

20 Claims, 9 Drawing Sheets

(56) References Cited

U.S. PATENT DOCUMENTS

| | | | |
|---|---|---|---|
| 3,703,255 | A | 11/1972 | Wade |
| 3,975,128 | A | 8/1976 | Schluter |
| 3,982,877 | A | 9/1976 | Wyeth et al. |
| 4,264,556 | A | 4/1981 | Kumar et al. |
| 4,428,906 | A | 1/1984 | Rozmus |
| 4,756,680 | A | 7/1988 | Ishii |
| 4,957,585 | A | 9/1990 | Semff |
| 5,137,663 | A | 8/1992 | Conaway |
| 5,137,755 | A | 8/1992 | Fujikawa et al. |
| 5,147,588 | A | 9/1992 | Okura et al. |
| 5,187,001 | A | 2/1993 | Brew |
| 5,306,448 | A | 4/1994 | Kromrey |
| 5,382,392 | A | 1/1995 | Prevorsek et al. |
| 5,516,271 | A | 5/1996 | Swenor et al. |
| 5,518,385 | A | 5/1996 | Graff |
| 6,054,082 | A | 4/2000 | Heide et al. |
| 6,261,486 | B1 | 7/2001 | Sulzbach et al. |
| 6,267,920 | B1 | 7/2001 | Arakawa et al. |
| 6,305,925 | B1 | 10/2001 | Cassani |
| 6,325,608 | B1 | 12/2001 | Shivakumar et al. |
| 6,372,166 | B1 | 4/2002 | Cassani |
| 6,508,970 | B2 | 1/2003 | Chandra |
| 6,521,152 | B1 | 2/2003 | Wood et al. |
| 6,537,470 | B1 * | 3/2003 | Wood et al. ............. 264/29.5 |
| 6,939,490 | B2 | 9/2005 | La Forest et al. |
| 7,025,913 | B2 | 4/2006 | La Forest et al. |
| 7,063,870 | B2 | 6/2006 | La Forest et al. |
| 7,172,408 | B2 | 2/2007 | Wood et al. |
| 7,198,739 | B2 | 4/2007 | La Forest et al. |
| 7,252,499 | B2 | 8/2007 | LaForest et al. |
| 7,318,717 | B2 | 1/2008 | Wood et al. |
| 7,332,112 | B1 * | 2/2008 | Shivakumar et al. ........ 264/29.5 |
| 7,393,370 | B2 | 7/2008 | Peterman, Jr. et al. |
| 7,442,024 | B2 | 10/2008 | La Forest et al. |
| 7,632,435 | B2 | 12/2009 | Simpson et al. |
| 7,698,817 | B2 | 4/2010 | Khambete et al. |
| 7,700,014 | B2 | 4/2010 | Simpson et al. |
| 7,727,448 | B2 | 6/2010 | Boutefeu et al. |
| 7,867,566 | B2 | 1/2011 | Blanton et al. |
| 7,972,129 | B2 | 7/2011 | O'Donoghue |
| 2003/0030188 | A1 | 2/2003 | Spengler |
| 2003/0111752 | A1 | 6/2003 | Wood et al. |
| 2004/0113302 | A1 | 6/2004 | La Forest et al. |
| 2004/0168612 | A1 * | 9/2004 | Saver ........................ 106/284 |
| 2006/0197244 | A1 * | 9/2006 | Simpson et al. ............ 264/29.7 |
| 2006/0279012 | A1 | 12/2006 | Simpson et al. |
| 2007/0063378 | A1 | 3/2007 | O'Donoghue |

FOREIGN PATENT DOCUMENTS

| | | |
|---|---|---|
| EP | 1 731 292 A3 | 12/2008 |
| WO | 2004/050319 A1 | 6/2004 |
| WO | 2004/052629 A1 | 6/2004 |
| WO | 2006/086167 A1 | 8/2006 |

OTHER PUBLICATIONS

La Forest et al., "Apparatus for Pitch Densification", filed Nov. 2, 2012.

Reply to communication form the Examination Division for EP Application No. 11187204.0, dated Dec. 3, 2012, 8 pages.

Office Action for U.S. Appl. No. 12/938,170, dated Jul. 5, 2012, 14 pages.

European Search Report from counterpart EP Application No. 11187201.0, mailed Jul. 3, 2012, 3 pages.

Examination Report form counterpart EP Application No. 11 187 204.0, mailed Aug. 3, 2012, 5 pages.

Office Action from U.S. Appl. No. 12/971,325, dated Sep. 27, 2013, 7 pages.

Response to an Office Action from U.S. Appl. No. 12/971,325, filed Jan. 27, 2014, 7 pages.

* cited by examiner

TECHNIQUES FOR PITCH DENSIFICATION

CROSS-REFERENCE TO RELATED APPLICATION

This application is a divisional application of U.S. application Ser. No. 12/938,201, filed Nov. 2, 2010, and entitled "APPARATUS FOR PITCH DENSIFICATION," the entire content of which is incorporated herein by reference.

TECHNICAL FIELD

This disclosure relates to pitch densification and, more particularly, to pitch densification for carbon-carbon composites.

BACKGROUND

Carbon fiber-reinforced carbon materials, also referred to as carbon-carbon (C—C) materials, are composite materials that generally include carbon fibers reinforced in a matrix of carbon material. The C—C composite materials are found in many rigorous, high temperature applications. For example, the aerospace industry is known to employ C—C composite materials for manufacturing different aircraft structural components. Example applications include rocket nozzles, nose cones, and friction materials for commercial and military aircraft such as, e.g., brake friction materials.

In some examples, C—C composites are manufactured using either woven or non-woven carbon fibers. The carbon fiber may be arranged to define a shape of a resulting structural component and, as such, may be referred to as a preform. The preform may undergo different processing steps to increase the carbon content and density of the preform to transform the preform into a C—C composite component. For example, carbon may be added to the preform using one or more pitch densification processes. In general, a pitch densification process operates to impregnate the carbon fiber preform with pitch that is subsequently cooled and solidified to produce a dense, high carbon content C—C component.

Different pitch densification processes often involve different chemical and mechanical force loading. Different carbon fiber preforms may also exhibit different chemical and mechanical properties, for example, due to different material morphologies, different manufacturing techniques, or the manufacturing tolerances inherent in most fabrication processes. If a pitch densification process selected for a specific carbon fiber preform is too aggressive, the preform may be damaged during the pitch densification process. In applications where the performance and quality of C—C components take precedence, a damaged preform may generally be of little use and may be discarded.

SUMMARY

In general, the disclosure relates to apparatuses and techniques for densifying an article such as a carbon fiber preform with pitch. In some examples, a single apparatus may be configured to densify a carbon fiber article with pitch (referred to herein also as "pitch densification") to form C—C composite material via multiple different pitch densification processes. For example, a single apparatus may be configured to perform each of resin transfer molding (RTM), a vacuum-assisted resin transfer molding (VRTM), or a vacuum pressure infiltration (VPI) to densify a carbon-based article with pitch all within the same mold of the densification apparatus.

To densify an article to a desired level using such an example apparatus, the article may be inserted within a mold cavity and subjected to one or more cycles of the same pitch densification process or multiple different densification processes. Depending on the particle densification process used, during a densification cycle, an apparatus may be configured to impregnate a carbon-fiber material with pitch within the mold cavity of the apparatus using ram pressure, gas pressure, vacuum pressure, or some combination thereof. For instances in which one or more cycles of two or more different pitch densification processes are used to densify a carbon fiber preform or other article, the article does not need to be removed from one apparatus and inserted into a separate apparatus to carry out different pitch densification processes. Instead, one or more cycles of each of the different densifications processes may be performed within the same mold cavity of an apparatus. In some instances, only a single type of pitch densification process (RTM, VRTM, or VPI) may be utilized to densify a preform. However, as a single apparatus may perform each type of pitch densification processes, the need for three separate apparatuses to perform each respective pitch densification process may be eliminated.

In some examples, a pitch densification process can be selected from among the plurality of different pitch densification processes based, for example, on the initial properties of an article to be densified. In some examples, the selected pitch densification process can be changed in-situ to a different one of the plurality of different pitch densification processes. In this way, an apparatus may adapt and respond to initial or changing properties of the material to be densified. As a result of the versatility of an apparatus configured to perform multiple pitch densification processes, improved C—C structural components may be formed with less attendant waste and component damage.

In some examples, a pitch densification apparatus may include a mold configured to receive both a preform (or other material to be densified) and a solid portion of pitch material. The apparatus may be configured to heat the solid portion of pitch material beyond the melting temperature of the pitch material within the mold. In some examples, the apparatus may also provide one or more pitch driving forces to further drive the melted pitch into the different pores of the material. By melting solid pitch in-situ, a low cost apparatus without external pitch melting equipment may be provided. Moreover, the amount of pitch provided to the material may be precisely controlled by eliminating transfer line loss and transfer line measuring inconsistencies associated with transferring melted pitch from a separate melt tank.

In one example according to the disclosure, an apparatus includes a mold configured to receive a material to be densified, a ram configured to apply a ram pressure to force a pitch into the mold to densify the material, a gas source configured to apply a gas pressure in the mold to force the pitch into the mold to densify the material, and a vacuum source operable to create a vacuum pressure in the mold at least prior to application of either the ram pressure or the gas pressure. According to the example, the apparatus is configured to densify the material in the mold using a selectable one of the ram, the gas source, the ram and the vacuum source, or the gas source and the vacuum source.

In another example according to the disclosure, an apparatus includes a mold configured to receive a brake disc preform, a ram configured to apply a ram pressure to force a melted pitch into the mold to densify the brake disc preform during at least one of a resin transfer molding cycle or a vacuum-assisted resin transfer molding cycle, an inert gas source configured to apply a gas pressure in the mold to force the melted pitch into the mold to densify the brake disc preform during a vacuum pressure infiltration cycle, and a vacuum source configured to create a vacuum pressure in the mold during at least one of the vacuum-assisted resin transfer molding cycle or the vacuum pressure infiltration cycle. According to the example, the apparatus is configured to densify the brake disc preform in the mold using a selectable one of the resin transfer molding cycle, the vacuum-assisted resin transfer molding cycle, or the vacuum pressure infiltration cycle.

In another example, a method is described that includes inserting a material to be densified into a mold, where the mold is part of an apparatus configured to densify the material using a selectable one of a resin transfer molding cycle, a vacuum-assisted resin transfer molding cycle, or a vacuum pressure infiltration cycle. The method includes selecting one of the resin transfer molding cycle, the vacuum-assisted resin transfer molding cycle, or the vacuum pressure infiltration cycle to densify the material in the mold, and densifying the material in the mold using the selected one of the resin transfer molding cycle, the vacuum-assisted resin transfer molding cycle, or the vacuum pressure infiltration cycle to densify the material to be densified.

In another example, an apparatus includes a mold configured to receive a preform and a solid pitch separate from the preform, a heating source thermally coupled to the mold, where the heating source is configured to heat the solid pitch above a melting temperature of the solid pitch within the mold to melt the solid pitch, and a gas source configured to apply a gas pressure in the mold to force melted pitch into the preform to densify the preform.

In another example, a method is described that includes inserting a preform into a mold, inserting a solid pitch into the mold, wherein the solid pitch is separate from the preform, heating the solid pitch to a temperature greater than a melting temperature of the solid pitch in the mold, densifying the preform within the mold by at least pressurizing the melted pitch.

In another example, a method is described that includes inserting a preform into a mold, where the mold is part of an apparatus configured to densify the preform using at least a vacuum pressure infiltration cycle, and inserting a solid pitch into the mold, where the solid pitch is separate from the preform, and wherein the solid pitch defines a shape substantially corresponding to a shape of the mold. The method also includes heating the solid pitch to a temperature greater than a melting temperature of the solid pitch within the mold, and densifying the preform within the mold using at least the vacuum pressure infiltration cycle to force melted pitch into the preform.

The details of one or more examples are set forth in the accompanying drawings and the description below. Other features, objects, and advantages will be apparent from the description and drawings, and from the claims.

DETAILED DESCRIPTION

Figure 1:
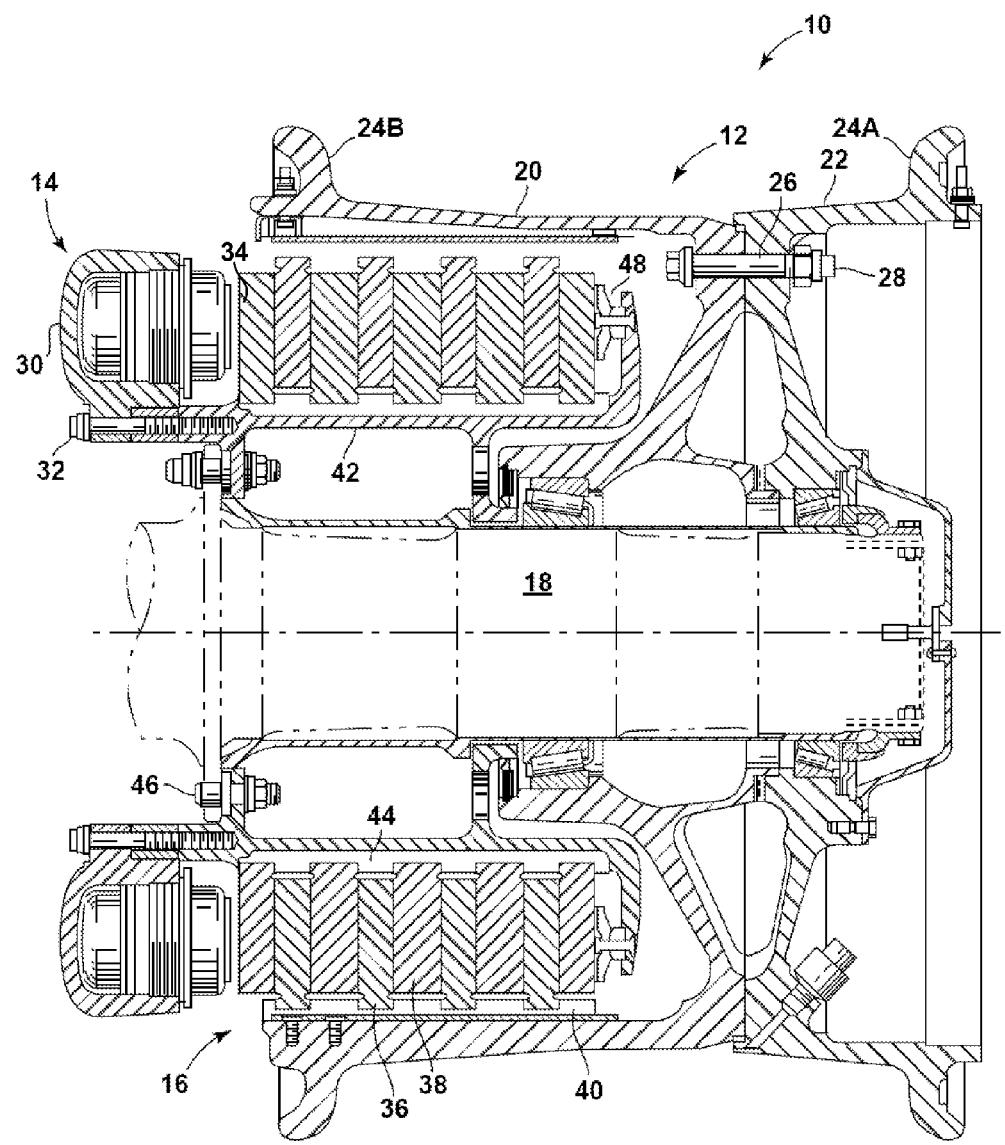
FIG. 1 is a schematic block diagram illustrating an example aircraft brake assembly.

During fabrication of a C—C composite material component, a carbon-based fiber material may undergo multiple processing steps to arrange, strengthen, and densify the carbon-based fiber material into a formed component. In different examples, the carbon-based fiber material may be processed via chemical vapor deposition (CVD) to add carbon to the material, resin transfer molding (RTM) to impregnate the material with high pressure (e.g., between 500 psi and 3500 psi) pitch, or vacuum pressure infiltration (VPI) to impregnate the material with comparatively lower pressure (e.g., between 25 psi and 800 psi) pitch. In some examples, the carbon-based fiber material may be subject to a combination of these processes, or additional or different processes. For example, the carbon-based fiber material may be subject to CVD to strengthen the fibers with deposited carbon before the fibers are further subject to pitch densification using an RTM and/or VPI process.

In general, CVD may involve placing a carbon-based fiber material in a high temperature atmosphere with a carbon-containing precursor material for an extended period of time. As the carbon-based fiber material and the carbon-containing precursor material react and/or degrade, carbon is deposited on the carbon-based fiber material, strengthening the material and increasing the density of the material. In some examples, different processing parameters, e.g., different processing control tolerances or different material morphologies, result in inconsistent densities and strengths for different carbon-based fiber materials. For example, CVD may be simultaneously performed on multiple preforms of carbon-based fiber material within a CVD chamber. After the CVD process, each of the multiple preforms may exhibit some variance in density or strength from an average density or strength, with some preforms exhibiting characteristics farther from the average than other preforms. These differing characteristics may affect subsequent processing of the preforms.

A carbon-based fiber material may be subject to pitch densification in addition to, or in lieu of, CVD to densify the material. In a pitch densification process, a pitch is impregnated in the carbon-based fiber material. Different pitch densification processes generally involve different mechanical loading forces, e.g., associated with different pitch driving forces and different pressure gradients in the carbon-based fiber material associated with each particular process. If a carbon-based fiber material is not strong enough to withstand a particular pitch densification process, the carbon-based fiber material may shear apart or delaminate (e.g., in cases in which a carbon preform includes multiple layers) during the densification process, rendering the material unsuitable for forming a high-performance component. Further, if an incorrect amount of pitch is delivered to the carbon-based fiber material, the material may be under densified, also rendering the material unsuitable for forming a high-performance component.

In accordance with some examples described in this disclosure, a pitch densification apparatus may be configured to carry out a plurality of different processes for densifying a material with pitch. As described above, in some examples, an apparatus may be configured to densify a material using RTM, VPI, and VRTM. Each of these pitch densification processes is described further below. Such a pitch densification apparatus may use a variety of driving forces to impregnate a carbon-based fiber material with pitch within a mold of the apparatus. Example driving forces that may be used to impregnate a carbon-based fiber material with pitch within a mold of an apparatus include ram pressure, gas pressure, vacuum pressure, and combinations thereof.

As the example pitch densification apparatus is capable of impregnating a carbon-based fiber material with pitch using a variety of driving forces, the particular process or processes performed by the apparatus to densify a carbon-based fiber material with pitch may be tailored based one or more considerations. For example, in some cases, the strength of the carbon-based fiber material may be determined, e.g., by determining the density of the material, and the particular process or processes used to densify the respective material with pitch may be selected based at least in part of the strength of the material. In some examples, the strength of a material or other variable that may be useful in selecting the particular process may be determined by the apparatus. In other examples, the apparatus does not evaluate the strength of the carbon-based fiber material. For example, the strength of a material may be determined instead by an operator controlling the apparatus, and the operator may operate the apparatus to perform one or more pitch densification processes determined to be suitable based on the determined strength of the material.

In any event, by utilizing multiple types of pitch driving forces, the apparatus can tailor a particular pitch densification process to the specific carbon-based fiber material. For example, for carbon-based fiber materials with relatively low initial densities, the apparatus may densify the material using VPI. A material with a low initial density may have less mechanical strength than materials with higher initial densities. Yet VPI may apply comparatively less mechanical force to the material during densification than other types of densification processes such as, e.g., RTM or VRTM. Conversely, for carbon-based fiber materials with relatively high initial densities, the apparatus may densify the material using RTM or VRTM. A material with a high initial density may have more mechanical strength than materials with lower initial densities. Further, a cycle of RTM or VRTM may add more pitch to the pores of the material during densification, thus densifying the material to a greater extent than VPI. In some additional examples, the apparatus may use two or more pitch densification processes to densify a specific carbon-based fiber material. For example, for carbon-based fiber materials with relatively low initial densities, the apparatus may first densify the material using VPI to densify and strengthen the material. The strengthened material may then be further densified within the same mold of the apparatus using RTM and/or VRTM. RTM and/or VRTM may increase the density of the material more rapidly than using VPI alone. However, VPI may strengthen and initially densify the material to withstand the forces of RTM and/or VRTM. As a result, a carbon-based material may be effectively densified while reducing or eliminating damage to the material.

In accordance with some examples described in this disclosure, a pitch densification apparatus includes mold that houses a material to be densified and a solid portion of pitch material within a mold cavity. The apparatus is configured to heat the solid portion of pitch material beyond the melting temperature of the pitch material within the mold cavity. In some examples, the solid portion of pitch material defines a shape substantially conforming to a cross-sectional shape of the material to be densified. In some examples, the pitch densification apparatus is configured to provide one or more pitch driving forces to drive melted pitch into the pores of the material to be densified. As a result, a precise amount of pitch may be added to the material to be densified without the cost and complexity of an external pitch melt tank and conveyance system.

An example apparatus configured to densify a material using one or more of a plurality of different pitch densification techniques will be described in greater detail with reference to FIGS. 2-4. An associated example technique is described below with reference to FIG. 5. In addition, an example technique and an example apparatus configured to densify a material using a mold configured to receive a solid portion of pitch in combination with a carbon-based fiber material is be described in greater detail with reference to FIGS. 6-9. However, an example aircraft brake assembly that may include one or more C—C composite materials manufactured in accordance with examples of this disclosure will first be described with reference to FIG. 1.

FIG. 1 is a conceptual diagram illustrating an example assembly that may include one or more C—C composite material components formed in accordance with the techniques of this disclosure. In particular, FIG. 1 illustrates an aircraft brake assembly 10, which includes wheel 12, actuator assembly 14, brake stack 16, and axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram 34. Brake stack 16 includes alternating rotor discs 36 and stators 38, which move relative to each other. Rotor discs 36 are mounted to wheel 12, and in particular wheel hub 20, by beam keys 40. Stator discs are mounted to axle 18, and in particular torque tube 42, by splines 44. Wheel assembly 10 may support any variety of private, commercial, or military aircraft.

Wheel assembly 10 includes wheel 18, which in the example of FIG. 1 is defined by a wheel hub 20 and a wheel outrigger flange 22. Wheel outrigger flange 22 is mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel assembly 10 may be mounted to an aircraft via torque tube 42 and axle 18. In the example of FIG. 1, torque tube 42 is affixed to axle 18 by a plurality of bolts 46. Torque tube 42 supports actuator assembly 14 and stators 38. Axle 18 may be mounted on a strut of a landing gear (not shown) to connect wheel assembly 10 to an aircraft.

During operation of the aircraft, braking may be necessary from time to time, such as during landing and taxiing. Accordingly, wheel assembly 10 may support braking through actuator assembly 14 and brake stack 16. Actuator assembly 14 includes actuator housing 30 and ram 34. Actuator assembly 14 may include different types of actuators such as, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor discs 36 and stator discs 38. Rotor discs 36 are mounted to wheel hub 20 for common rotation by beam keys 40. Stator discs 38 are mounted to torque tube 42 for common rotation by splines 44. In the example of FIG. 1, brake stack 16 includes four rotors and five stators. However, a different number of rotors and/or stators may be included in brake stack 16. Further, the relative positions of the rotors and stators may be reverse, e.g., such that rotor discs 36 are mounted to torque tube 42 and stator discs 38 are mounted to wheel hub 20.

Rotor discs 36 and stator discs 38 may provide opposing friction surfaces for braking an aircraft. As kinetic energy of a moving aircraft is transferred into thermal energy in brake stack 16, temperatures may rapidly increase in brake stack 16, e.g., beyond 200 degrees Celsius. With some aircraft, emergency braking may result in temperatures in excess of 500 degrees Celsius, and in some cases, even beyond 800 degrees Celsius. As such, rotor discs 36 and stator discs 38 that form brake stack 16 may include robust, thermally stable materials capable of operating at such temperatures. In one example, rotor discs 36 and stator discs 38 are formed of a metal alloy such as, e.g., a super alloy based on Ni, Co, Fe, or the like.

In another example, rotor discs 36 and/or stator discs 38 are formed of a C—C composite material fabricated according to one or more example techniques of this disclosure. In particular, at least one of rotor discs 36 and/or at least one of stator discs 38 may be formed from a carbon-based fiber material fabricated using a pitch densification apparatus, where the apparatus is capable of densifying the material using one or more of a plurality of different pitch densification processes. In some examples, at least one of rotor discs 36 and/or at least one of stator discs 38 may be formed using an example apparatus that includes a mold configured to receive both material to be densified and a solid portion of pitch material. By using an example apparatus according to this disclosure, a C—C composite component may be formed that defines a general shape of a rotor disc or stator disc.

Independent of the specific material chosen, rotor discs 36 and stator discs 38 may be formed of the same materials or different materials. For example, wheel assembly 10 may include metal rotor discs 36 and C—C composite stator discs 38, or vice versa. Further, each disc of the rotor discs 36 and/or each disc of the stator discs 38 may be formed of the same materials or at least one disc of rotor discs 36 and/or stator discs 38 may be formed of a different material than at least one other disc of the rotor discs 36 and/or stator discs 38.

As briefly noted, rotor discs 36 and stator discs 38 may be mounted in wheel assembly 10 by beam keys 40 and splines 44, respectively. Beam keys 42 may be circumferentially spaced about an inner portion of wheel hub 20. Beam keys may be shaped with opposing ends (e.g., opposite sides of a rectangular) and may have one end mechanically affixed to an inner portion of wheel hub 20 and an opposite end mechanically affixed to an outer portion of wheel hub 20. Beam keys 42 may be integrally formed with wheel hub 20 or may be separate from and mechanically affixed to wheel hub 20, e.g., to provide a thermal barrier between rotor discs 36 and wheel hub 20. Toward that end, in different examples, wheel assembly 10 may include a heat shield (not shown) that extends out radially and outwardly surrounds brake stack 16, e.g., to limit thermal transfer between brake stack 16 and wheel 12.

Splines 44 may be circumferentially spaced about an outer portion of torque tube 42. Splines 44 may be integrally formed with torque tube 42 or may be separate from and mechanically affixed to torque tube 42. In some examples, splines 44 may define lateral grooves in torque tube 42. As such, stator discs 38 may include a plurality of radially inwardly disposed notches configured to be inserted into a spline.

Because beam keys 40 and splines 44 may be in thermal contact with rotor discs 36 and stator discs 38, respectively, beam keys 40 and/or splines 44 may be made of thermally stable materials including, e.g., those materials discussed above with respect to rotor discs 36 and stator discs 38. Accordingly, in some examples, example techniques of the disclosure may be used to form a beam key and/or spline for wheel assembly 10. For example, a pitch densification apparatus, such as, e.g., apparatus 50 (FIG. 2), that is configured to densify a material using one or more of a plurality of different pitch densification cycles, may be used to form a C—C composite component that defines a general shape of beam key 40 and/or spline 44. In some examples, a pitch densification apparatus, such as, e.g., apparatus 300 (FIG. 6), that includes a mold configured to receive both material to be densified and a solid portion of pitch material, may be used to form a C—C composite component that defines a general shape of beam key 40 or spline 44.

Figure 2:
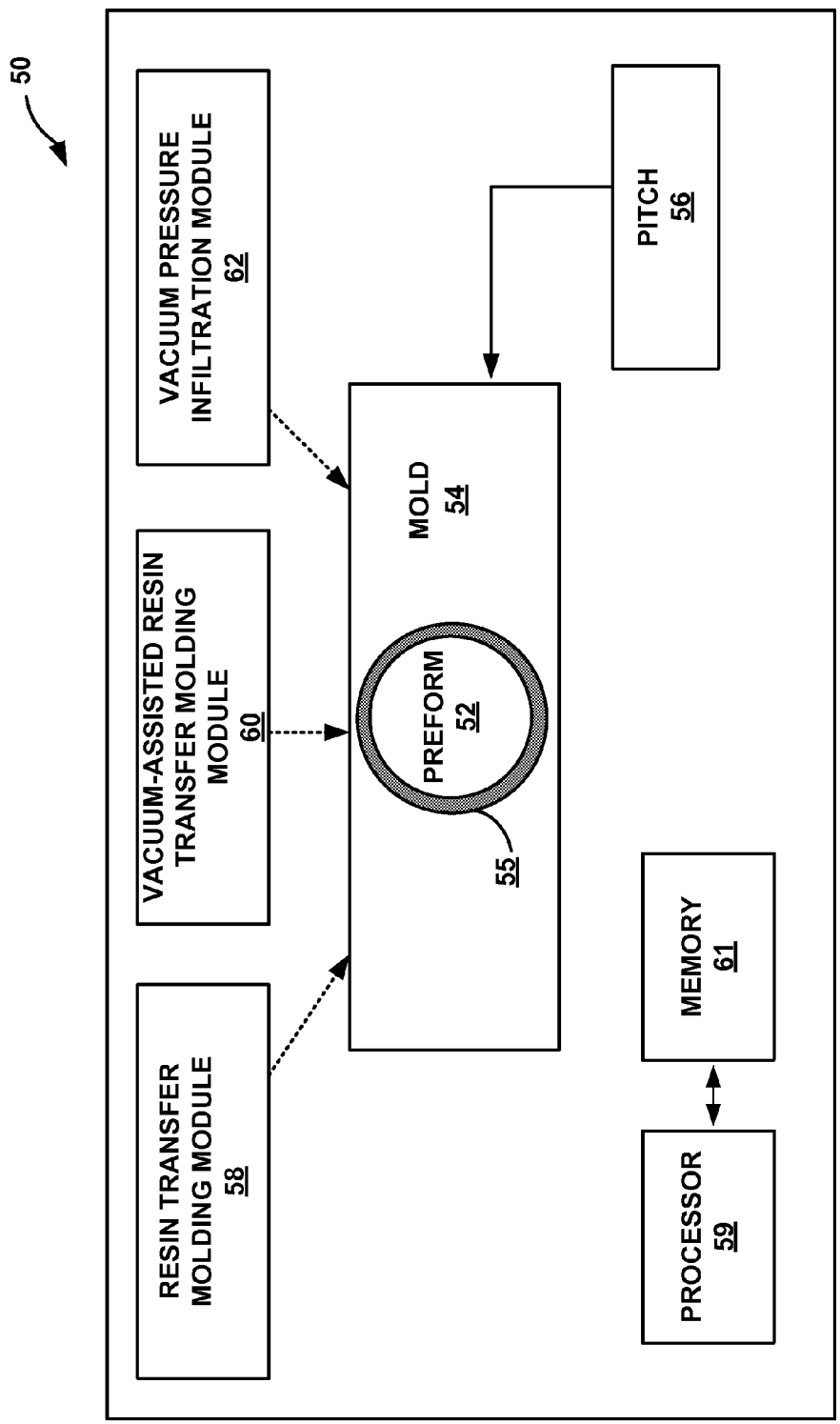
FIG. 2 is a conceptual block diagram illustrating an example pitch densification apparatus configured to densify an article with pitch using one of a plurality of different pitch densification techniques.

FIG. 2 is a conceptual block diagram illustrating an example pitch densification apparatus 50. Apparatus 50 is configured to densify a material using one or more of a plurality of different pitch densification techniques. In particular, apparatus 50 is configured to densify a material via one or more of a resin transfer molding (RTM) process (represented in FIG. 2 as resin transfer molding module 58), a vacuum-assisted resin transfer molding (VRTM) process (represented in FIG. 2 as vacuum-assisted resin transfer molding module 60), and/or a vacuum pressure infiltration (VPI) process (represented in FIG. 2 as vacuum pressure infiltration module 62). In general, RTM module 58, VRTM module 60, and VPI module 62 are representative in FIG. 2 of the various structural features and components in apparatus 50 that allow apparatus 50 to perform each of the respective processes to densify preform 52. Examples of the structural features and components represented by RTM module 58, VRTM module 60, and VPU module 62 include those described herein with regard to each respective process.

However, while RTM module 58, VRTM module 60, and VPI module 62 are shown in FIG. 2 as being separate from one another, it is contemplated that certain structural features and components of apparatus 50 may be utilized to perform more than one of the described processes. That is, while RTM module 58, VRTM module 60, and VPI module 62 are shown separately, components and structural features of apparatus 50 that allow for the respective processes to be performed are not necessarily exclusive to one or more process. In some examples, certain components and structural features of apparatus 50 may be used to perform two or more of RTM, VRTM, and VPI. As described below, in some examples, the combination of RTM module 58, VRTM module 60, and VPU module 62 include a ram to apply a ram pressure, a gas source to apply a gas pressure, and a vacuum source to create vacuum pressure selectively all within mold 54 to impregnate a material such as preform 52 with pitch.

Apparatus 50 includes mold 54, which defines one or more mold cavities 55 that houses preform 52 (or other carbon-based material) to be densified by apparatus 50. In some examples, preform 52 defines a shape corresponding to a shape of a finished component prior to being inserted into mold 54. During operation of apparatus 50, pitch 56 is pressurized in mold cavity 55 of mold 54 to fill the pores of preform 52. In some examples, melted pitch 56 is conveyed into mold cavity 55 of mold 54 during operation of apparatus 50 to densify preform 52. In other examples, as described in greater detail below, solid pitch may be inserted into mold cavity 55 of mold 54 at the beginning of a pitch densification cycle along with preform 52. In either set of examples, apparatus may selectively pressurize the pitch in mold cavity 55 using one or more of RTM module 58, VRTM module 60, and VPI module 62. In this manner, apparatus 50 may be used to increase the density of preform 52 by impregnating preform 52 with pitch to form a C—C composite component.

In general, C—C composite components include carbon materials reinforced in a carbon matrix. Accordingly, preform 52 or other materials densified by apparatus 50 may include, but are not limited to, woven and non-woven carbon-based fiber materials. The carbon-based fiber materials may, in some examples, be straight, chopped, granular, or otherwise shaped. In some examples, the carbon-based fiber materials may include a polyacrilonitrile (PAN) fiber. In other examples, the carbon-based fiber materials may include carbon fibers, pitch fibers, or combinations of the aforementioned fibers.

Prior to being inserted into apparatus 50 for densification, the material to densified within apparatus 50 may undergo processing to prepare the material for densification. According to one example, the material may be processed into preform 52 prior to being inserted into cavity 55 of mold 54. Preform 52 may define a general shape of a desired finished component. For example, preform 52 may define a general shape of rotor disc 36, stator disc 38, beam key 40, or another component of aircraft brake assembly 10 (FIG. 1). The shape may be a generally two-dimensional shape defined by a single layer of carbon-based fiber material. Alternatively, the shape may be a three-dimensional shape. For example, a plurality of layers of carbon-based fiber material may be stacked on top of one another to define a three-dimensionally shaped working piece.

In some examples, the working piece may be needled in a direction generally orthogonal to each of the plurality of layers to entangle fibers between layers. For example, the working piece may be subject to mechanical needling or hydroentanglement to entangle fibers between layers. In this manner, the working piece may be axially strengthened between different layers of the multilayer piece. The working piece may then be cut to define a preformed shape corresponding to that of a desired finished component. Alternatively, different layers of the multilayer preform may be cut prior to assembly, and the different layers may be combined to define a preformed shaped. In either case, the material to be densified may be processed to form preform 52 prior to being inserted into mold cavity 55 for pitch densification.

As another example of a processing step that may be performed on preform 52 or another material prior to being inserted into mold cavity 55, preform 52 may undergo one or more cycles of chemical vapor deposition. Prior to or after being processed into preform 52, the material that forms preform 52 may undergo chemical vapor deposition to strengthen and initially densify the material in preparation for further processing on apparatus 50. In general, chemical vapor deposition (CVD), which may also be referred to as chemical vapor infiltration (CVI), involves placing preform 52 in a high temperature atmosphere with a carbon-containing precursor material for an extended period of time. In some examples, preform 52 may be placed in an oven operating under a blanket of inert gas, e.g., to prevent premature oxidation of preform 52. After the oven reaches a suitable temperature, e.g., between 850 degrees Celsius and 1250 degrees Celsius, the inert gas may be replaced with a carbon-bearing gas. Example gases include, but are not limited to, methane, ethane, propane, butane, propylene, acetylene, and combinations thereof. As the hydrocarbon gas flows around and through the porous structure of preform 52, a series of dehydrogenation, condensation, and/or polymerization reactions may occur, depositing carbon atoms on and through the surfaces of preform 52. As the number of carbon atoms deposited on preform 52 increase, the fibers of preform 52 may strengthen and the density of preform 52 may increase.

In some examples, preform 52 may exhibit a density before chemical vapor deposition between approximately 0.4 grams per cubic centimeter (g/cc) and approximately 0.6 g/cc. After a cycle of chemical vapor deposition, preform 52 may exhibit a density between approximately 0.9 g/cc and approximately 1.45 g/cc. Different initial and post-processing densities are possible, however. In general, a cycle of chemical vapor deposition may be defined as a single densification during which perform 52 is infiltrated with pitch under one defined set of conditions (e.g., gas flow rates, temperature, time, etc.). While preform 52 may undergo multiple cycles of chemical vapor deposition, e.g., both before and/or after using apparatus 50, each cycle of chemical vapor deposition may last an extended period of time. In some examples, a cycle of chemical vapor deposition may last between one and five weeks.

Regardless of the particular preprocessing steps used, preform 52 may be inserted into mold cavity 55 defined by mold 54 prior to being densified in apparatus 50 using RTM module 58, VRTM module 60, and/or VPI module 62. Mold cavity 55 may define a shape generally corresponding to a shape of a desired finished C—C composite component. For example, mold 54 may define mold cavity 55 that has a shape generally corresponding to a shape of preform 52. Mold 54 may include different ports for receiving pitch 56 in cavity 55, venting air forced out of the pores of the material by pitch 56, receiving pressurized gas, evacuating gas to create a vacuum pressure, or the like. During operation of apparatus 50, preform 52 may be constrained within mold cavity 55 along with pressurized pitch 56. In some examples, mold 54 may be separate from and insertable into apparatus 50. In other examples, mold 54 may be integrally formed with apparatus 50.

After being inserted into mold cavity 55 of mold 54, apparatus 50 may densify preform 52 by impregnating preform 52 with pitch 56. Pitch 56 may be a hydrocarbon-rich material that may be extracted, e.g., from coal tar and petroleum. Pitch 56 may also be synthetically produced. In different examples, pitch 56 may come from a single source (e.g., coal) or may be a combination of different pitches from different sources. In some examples, pitch 56 may be a mesophase pitch. In other examples, pitch 56 may be an isotropic pitch. Combinations of mesophase and isotropic pitches are also contemplated.

Pitch 56 may have a melting temperature greater than typical ambient temperatures. As such, pitch 56 may be heated to a flowable state prior to densification of preform 52. In some examples, as described in greater detail below with respect to FIG. 6, pitch 56 may be added to apparatus 50, and in particular mold cavity 55 of mold 54, in a solid state along with preform 52 and then heated above the melting temperature in apparatus 50 during densification. In other examples, as described in greater detail below with respect to FIG. 3, pitch 56 may be heated above the melting temperature separately from apparatus 50 and conveyed into mold cavity 55 of apparatus 50 as a melted pitch. In some examples, pitch 56 may be heated to a temperature between approximately 200 degrees Celsius and approximately 450 degrees Celsius such as, e.g., between approximately 275 degrees Celsius and approximately 330 degrees Celsius to melt into a flowable state.

Apparatus 50 in the example of FIG. 2 is configured to densify preform 52 using a variety of pitch densification techniques. According to one technique, apparatus 50 is configured to densify preform 52 with pitch 56 using at least one cycle of RTM via RTM module 58. In general, a cycle of RTM involves injecting pressurized pitch 56 into mold cavity 55 through one or more injection port defined in mold 54. As described in greater detail below with respect to FIG. 3, during a RTM cycle, pitch 56 is pressurized using a ram such as, e.g., a piston or plunger. During a RTM cycle, a backstroke of the ram may create a vacuum that draws melted pitch 56 into a ram cavity. Alternatively, a ram cavity may be forcibly loaded with melted pitch, e.g., using an extruder screw. In either case, a forward stroke of the ram may apply a ram pressure, pressurizing pitch 56 and forcing pitch 56 into mold cavity 55 of mold 54. The pressurized pitch 56 may travel through channels into mold cavity 55 of mold 54, displacing air in mold cavity 55 and the pores of preform 52. In this manner, preform 52 may be impregnated with pitch 56 by RTM, thereby increasing the density of preform 52.

The operating pressure during a RTM cycle may be relatively high compared to other pitch densification processes provided by apparatus 50, such as, e.g., a VRTM molding cycle and/or a VPI cycle. In some examples, a RTM cycle may involve a ram pressure (i.e., the amount of pressure that pitch 56 is pressurized to using a ram to force pitch 56 into mold cavity 55 of mold 54) between approximately 100 pounds per square inch (psi) and approximately 5000 psi, such as, e.g., between approximately 500 psi and approximately 3500 psi.

A high pressure RTM cycle may effectively cause pitch 56 to infiltrate and impregnate the various pores of preform 52. For example, before a RTM cycle, preform 52 may exhibit a density between approximately 1.0 g/cc and approximately 1.5 g/cc. After a cycle of RTM, however, preform 52 may exhibit a density between approximately 1.6 g/cc and approximately 1.8 g/cc, where a cycle of resin transfer molding may be defined as a single densification during which perform 52 is infiltrated with pitch under one defined set of conditions (e.g., gas flow rates, temperature, time, etc.). Further, densification via RTM within apparatus 50 may be rapid, e.g., compared to VRTM and/or VPI, in some cases lasting less than approximately 10 minutes such as, e.g., less than approximately 3 minutes per cycle. For example, when preform 52 exhibits small pore sizes, RTM may be able to drive pitch 56 into preform 52 at a faster rate than VRTM and/or VPI. However, if preform 52 is structurally weak prior to densification via apparatus 50, the high pressure pitch 56 associated with a RTM cycle may result in the destruction of preform 52, or damage to the structure of preform 52, during densification. Without being bound by any particular theory, it is believed that as pitch 56 initially infiltrates preform 52, a pressure gradient is created across preform 52. The pressure gradient may cause internal stresses within preform 52. If preform 52 is not strong enough to accommodate the internal stresses, all or sections of preform 52 may shear or different layers of preform 52 may delaminate, destroying the shape and mechanical strength of preform 52. The internal stresses created within preform 52 may increase as the pressure of pitch 56 increases.

Therefore, to accommodate preforms with different types of properties, apparatus 50 may be configured to densify preform 52 using different densification techniques in addition to, or in lieu of, RTM. For example, apparatus 50 may densify preform 52 using one or more VRTM cycles via VRTM module 60. A VRTM cycle may be considered a form of RTM cycle in which a vacuum pressure is created in mold cavity 55 of mold 54 at least prior to the beginning of the RTM cycle. By creating a vacuum pressure in mold cavity 55 of mold 54 at least prior to the beginning of RTM, the ram pressure required to densify preform 52 with pitch 56 during the RTM cycle may, in some examples, be lowered as compared to when vacuum pressure is not created in mold cavity 55 of mold 54. Again not wishing to be bound by any particular theory, it is believed that air in mold cavity 55 of mold 54, and in particular the pores of preform 52, may create backpressure inhibiting the free flow of pitch 56 during densification. This backpressure may exacerbate a pressure gradient across preform 52 when initially injecting pitch into preform 52. By creating a vacuum in mold cavity 55 of mold 54 at least prior to injecting pitch 56 into mold cavity 55 of mold 54 during a RTM cycle, a lower ram pressure may be accommodated while still suitably impregnating preform 52 with pitch 56. Moreover, by creating a vacuum in mold cavity 55 at least prior to injecting pitch 56 into mold cavity 55, the pores of preform 52 may be opened and air bubbles may be removed from preform 52, allowing preform 52 to be densified while reducing or eliminating the possibility of damage (e.g., delamination) to preform 52 during the RTM portion of the VRTM cycle.

In some examples, a VRTM cycle may include reducing the pressure in mold cavity 55 to between approximately 1 torr and approximately 100 torr, such as, e.g., between approximately 10 torr and approximately 20 torr. In some examples, a RTM cycle performed after reducing the pressure in mold 54 may involve a ram pressure between approximately 500 psi and approximately 3500 psi, such as between approximately 750 psi and approximately 2000 psi, or between approximately 800 psi and approximately 1000 psi. Other pressures are contemplated, however, and the disclosure is not limited in this respect.

By first reducing the pressure in mold cavity 55 and then forcibly injecting pitch into mold cavity 55, preform 50 may be densified with pitch. As with a RTM cycle, preform 52 may exhibit a density between approximately 0.9 g/cc and approximately 1.4 g/cc before densification. After a VRTM cycle, however, preform 52 may exhibit a density between approximately 1.5 g/cc and approximately 1.7 g/cc, where a cycle of VRTM may be defined as a single densification during which perform 52 is infiltrated with pitch under one defined set of conditions (e.g., gas flow rates, temperature, time, etc.).

As another pitch densification technique, apparatus 50 may be configured to perform one or more cycles of VPI via VPI module 62. During a VPI cycle, mold cavity 55 may be reduced to vacuum pressure to evacuate the pores of preform 52. In some examples, a vacuum pressure between approximately 1 torr and approximately 100 torr, such as, e.g., between approximately 10 torr and approximately 20 torr may be created. With the pores of preform 52 ready to receive pitch 56, mold cavity 55 may be flooded with pitch 56. In examples where a portion of solid pitch is provided in mold cavity 55, as will be described with reference to FIG. 6, flooding may be accomplished by heating pitch 56 above the melting temperature of pitch 56. In examples where pitch 56 is conveyed to mold 54 in a flowable state, as will be described with reference to FIG. 3, flooding may be accomplished, e.g., by pressurizing a tank of pitch 56, mechanically conveying pitch 56, or allowing a vacuum pressure in mold cavity 55 to draw pitch 56 into mold cavity 55 to begin infiltrating preform 52. After flooding, a gas such as, e.g., an inert nitrogen gas, can be used to pressurize pitch 56 in mold cavity 55. In some examples, a gas pressure between approximately 10 pounds per square inch (psi) and approximately 1000 psi, such as, e.g., between approximately 300 psi and approximately 700 psi may be used. Pressurization may help pitch 56 travel through the different pores of preform 52. In this manner, apparatus 50 may be used to density a material through one or more cycles of VPI.

In some examples, preform 52 may exhibit a density between approximately 0.4 g/cc and approximately 0.6 g/cc prior to densification. On the other hand, after a VPI cycle, preform 52 may, in some examples, exhibit a density between approximately 1.5 g/cc and approximately 1.8 g/cc. A cycle of vacuum pressure infiltration (62) may be defined as a single densification during which perform 52 is infiltrated with pitch under one defined set of conditions (e.g., gas flow rates, temperature, time, etc.).

Because a VPI cycle does not include the use of ram pressure to drive pitch 56 into preform 52, the densification cycle may be gentler on preform 52 compared to other types of densification cycles such as RTM and VRTM. This may provide versatility by allowing apparatus 50 to process preforms exhibiting different types of physical characteristics. For example, a VPI cycle may be performed on a preform 52 that does not undergo a chemical vapor deposition strengthening process prior to being densified on apparatus 50. As another example, VPI cycle may be used on a preform 52 that is not suitably strengthened during a chemical vapor deposition process. In other words, a comparatively preform 52 may be densified using one or more VPI cycles. Additional uses are contemplated for vacuum pressure infiltration cycle.

In general, apparatus 50 may densify preform 52 with pitch within mold cavity 55 using one or more of RTM module 58, VRTM module 60, and VPI module 62. In some instances, apparatus 50 may densify preform 52 with pitch to a desired density using one or more cycles of the same process (i.e., one of RTM, VRTM, and VPI). Following the densification of preform 52, another preform may be inserted in mold cavity 55 and apparatus 50 may densify the another preform with pitch to a desired density using one or more cycles of the same process, where the process is different from that used to densify the preceding preform 52. For example, apparatus 50 may densify the another preform using VRTM or VPI, when the preceeding preform 52 was densified with RTM. In this manner, apparatus 50 embodies a single apparatus that is capable of performing all of RTM, VRTM, and VPI to densify preform 52 within mold 54, e.g., rather than requiring three individual apparatuses to carry out each of the respective pitch densification processes. In some examples, apparatus 50 may densify preform 52 using two or more of RTM, VRTM, and VPI. For example, after being inserted into mold cavity 55, apparatus 50 may perform one or more cycles of VPI to densify preform 52 to a desired density followed by one or more cycles of RTM and/or VRTM to further densify preform 52. Alternative combinations of RTM, VRTM, and VPI are possible to densify preform 52, as will be appreciated by those of skill in the art.

By providing different types of pitch densification driving forces, apparatus 50 may be able to densify preforms with a range of different characteristics. In some examples, selection of one or more of RTM, VRTM, and VPI cycles may be based on an initial density of preform 52 prior to densification within apparatus 50. As described above, the initial density of preform 52 may be indicative of an initial strength of preform 52. Further, preform strength may indicate the ability of a specific preform to withstand a specific densification technique without substantiating structural damage.

The strength of preform 52 may vary, e.g., based on the specific materials and processing steps used to form preform 52. The forces associated with a specific densification technique may also vary, e.g., based on the specific densification apparatus used and the specific processing parameters selected. However, in some examples, preform 52 may be able to withstand the forces of associated with RTM if preform 52 has an initial density greater than or equal to 1.0 g/cc. In some examples, preform 52 may be able to withstand the forces of associated with VRTM if preform 52 has an initial density between approximately 0.8 g/cc and approximately 1.0 g/cc. In some further examples, preform 52 may be able to withstand the forces of associated with VPI even if preform 52 exhibits a density less than or equal 0.8 g/cc such as, e.g., less than approximately 0.5 g/cc. These density values may vary based on a variety of factors such as, e.g., the overall volume of preform 52, however, and it should be appreciated that the disclosure is not limited in this regard.

In some examples, the density of preform 52 may be determined external to apparatus 50 and a particular densification cycle (RTM, VRTM, or VPI) may be selected based on the externally determined density, e.g., by operator entry. In other examples, however, apparatus 50 may include processor 59 that determines a density of preform 52 and automatically select one or more of RTM, VRTM, and/or VPI cycles based on the determined density of preform 52. In one example, apparatus 50 may include a scale (not shown) that weighs preform 52 within cavity 55. The volume of preform 52 may be separately entered into apparatus 50, e.g., by an operator, and processor 59 of apparatus 50 may determine the density based on the entered volume and the measured weight from the scale. In another example, apparatus 50 may include instrumentation to determine both a weight and volume of preform 52, and processor 59 of apparatus 50 may receive measured data and determine a density of preform 52. In additional examples, processor 59 of apparatus 50 may be communicatively coupled to different instrumentation of apparatus 50 such as, e.g., a density meter, to determine the density of preform 52.

Independent of the process used by apparatus 50 to determine the density of preform 52, processor 59 of apparatus 50 may compare the determined density to one or more threshold density values stored in memory 61 associated apparatus 50. In some examples, the threshold density values may correspond to different density thresholds that allow preform 52 to withstand a force associated with of one or more of RTM, VRTM, and VPI, as discussed above. Based on the comparison, processor 59 of apparatus 50 may select a specific densification cycle to densify preform 52 with pitch within cavity 55.

Figure 3:
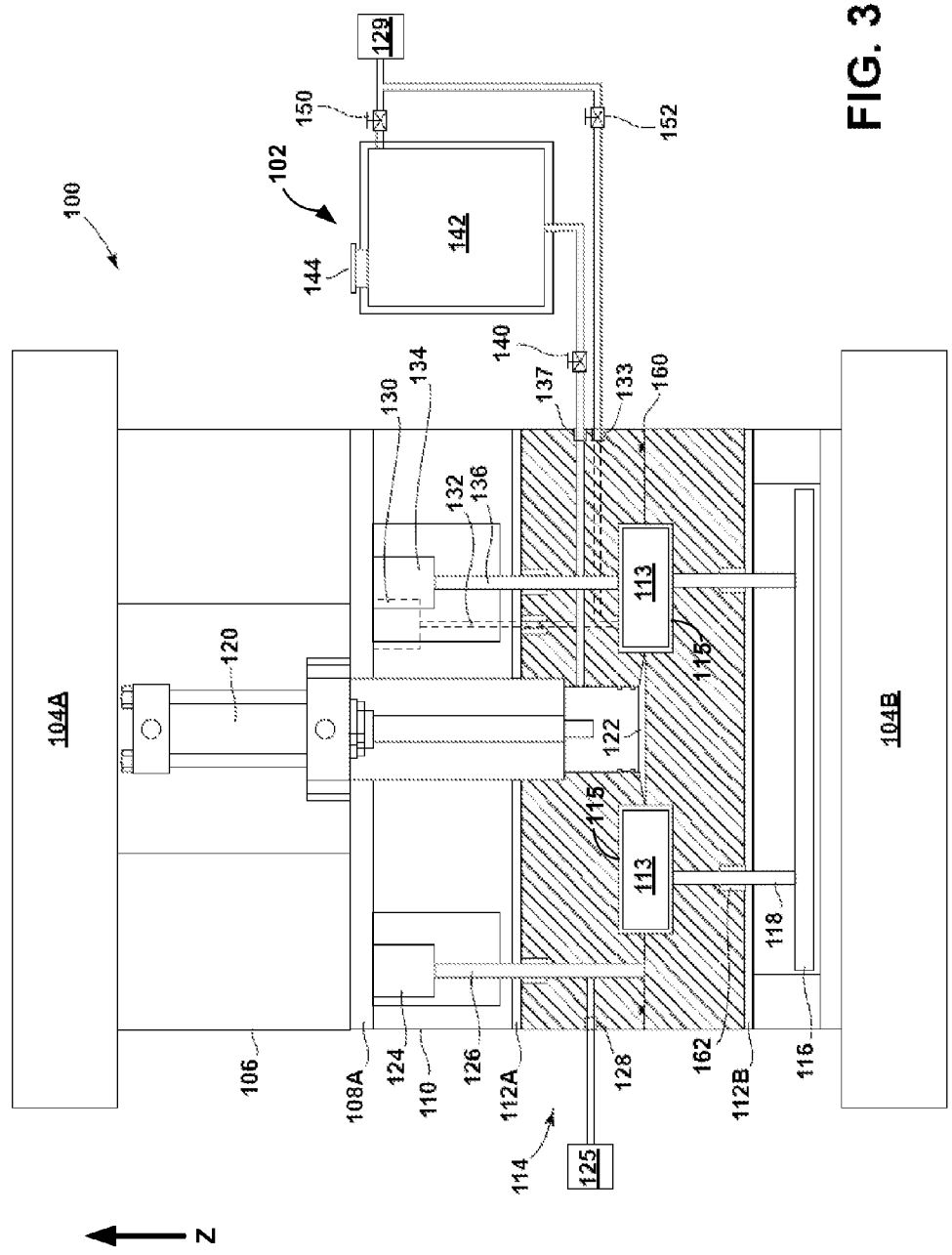
FIG. 3 is a schematic block diagram illustrating another example pitch densification apparatus configured to densify an article with pitch using one of a plurality of different pitch densification techniques.

FIG. 3 is a schematic diagram illustrating an example pitch densification apparatus 100. Pitch densification apparatus 100 is configured to densify a material using one or more of a plurality of different pitch densification techniques. Apparatus 100 is an example of apparatus 50 (FIG. 2) and illustrates various components that may be included in apparatus 50 and configured to densify preform 52 with RTM, VRTM, and VPI. In the example of FIG. 3, apparatus 100 is connected to a separate pitch melt apparatus 102, which supplies melted pitch to apparatus 100 during a pitch densification cycles. In different examples, however, apparatus 100 may include an integrated pitch melt system or, as described in greater detail below with respect to FIG. 6, a portion of solid pitch may be placed in the mold of apparatus 100.

Apparatus 100 includes press platen 104A and 104B, bolster 106, clamp plates 108A and 108B, backing plate 110, insulating plates 112A and 112B, bolster ejector plate 116, ejector pins 118, ram cylinder 120, pitch pressurization ram 122, vacuum line control cylinder 124, vacuum line control rod 126, vacuum port 128, gas feed control cylinder 130, gas control rod 132, gas port 133, pitch feed control cylinder 134, and pitch control rod 136. Mold 114 is interposed between insulating plates 112A and 112B. Mold 114 (which is shaded in the example of FIG. 3) defines mold cavity 115, which houses preform 113.

Pitch discharge valve 140 connects pitch melt apparatus 102 to mold cavity 115 of apparatus 100. Pitch melt apparatus 102 includes pitch tank 142, pitch feed inlet 144, temperature control jacket 146, and pitch liquefaction system 148. Pitch tank gas valve 150 and apparatus gas valve 152 connect apparatus 100 and pitch melt apparatus 102, respectively, to gas source 129.

In general, press platens 104A and 104B apply pressure from opposing directions to constrain the various features of apparatus 100 during a pitch densification cycle. One or both of press platens 104A and 104B may move in the Z-direction illustrated on FIG. 3 to allow mold 114 to open at a mold parting line sealed by mold parting seal 160, e.g., to insert or remove preform 113 from mold cavity 115 of apparatus 100. Press platens 104A and 104B may be integrally formed (i.e., permanently connected) with other features of apparatus 100, or press platens 104A and 104B may be separate features, as illustrated in FIG. 3. In other words, press platens 104A and 104B may be purpose-built or may be part of a standard press to which other components of apparatus 100 are added.

Press platen 104A and 104B are connected to bolster 106 and clamp plate 108B, respectively. In turn, bolster 106 is connected to clamp plate 108A, while clamp plate 108B is connected to bolster ejector plate 116. In general, bolster 106 and bolster ejector plate 116 may function to define cavities for receiving and housing various features of apparatus 100. For example, bolster 106 defines a cavity to receive ram cylinder 106 and bolster ejector plate 116 defines cavities to receive ejector pins 118. Bolster 106 and bolster ejector plate 116 may protect the various features from the pressing force of press platens 104A and 104B during operation of apparatus 100.

Clamp plates 108A is interposed between bolster 106 and backing plate 110. Clamp plate 108B, by contrast, is interposed between bolster ejector plate 116 and insulating plate 112B. Clamp plates 108A and 108B function to clamp different features of apparatus 100 from moving out of alignment.

Apparatus 100 includes backing plate 110 interposed between clamp plate 108A and insulating plate 112A. Backing plate 110 defines cavities for receiving and housing various features of apparatus 100. For example, backing plate 110 defines a cavity to receive pitch pressurization ram 122, vacuum line control cylinder 124, vacuum line control rod 126, gas feed control cylinder 130, gas control rod 132, pitch feed control cylinder 134, and pitch control rod 136. Backing plate 110 may protect the different features from the pressing force of press platens 104A and 104B during operation of apparatus 100.

Mold 114 is located between insulating plates 112A and 112B. Insulating plates 112A and 112B may limit thermal transfer away from mold 114, e.g., to help mold 114 retain heat during a pitch densification operation. Accordingly, insulating plates 112A and 112B may, in some examples, be formed from a low thermal conductivity material. To further limit thermal transfer away from mold 114, connection lines extending between mold 114 and other features of apparatus 100 may, in some examples, be provided with insulating seals 162, as shown in FIG. 3. Insulating seals 162 may prevent thermal transfer through openings in insulating plates 112A and 112B.

Mold 114 is configured to receive a material to be densified, such as, e.g., preform 113, by apparatus 100. Mold 114 is an example of mold 54 (FIG. 2). Mold 114 defines one or more mold cavities 115 that house preform 113 (or other carbon material) to be densified. Mold 114 may be formed of soft tooling materials such as, e.g., a polyester or an epoxy polymer. Alternatively, mold 114 may be formed of hard tooling materials such as, e.g., cast or machined aluminum, nickel, steel, titanium, or the like. Mold 114 may define different channels for conveying pitch, venting air, drawing a vacuum, receiving pressurized gas, or the like to mold cavity 115.

During one or more pitch densification cycles, a vacuum pressure may be created in mold cavity 115 for at least part of the densification cycle. Accordingly, apparatus 100 may include vacuum hardware connectable to a vacuum source to create a vacuum pressure in mold cavity 115. In the example of FIG. 3, vacuum hardware is provided by vacuum line control cylinder 124, vacuum line control rod 126, and vacuum port 128. Vacuum port 128 provides a connection point between vacuum source 125, which is operable to create a vacuum in mold 114, and in particular mold cavity 115, that contains preform 113. Vacuum line control cylinder 124 is connected to vacuum line control rod 126. In operation, vacuum line control rod 126 may be controllably actuated in the Z-direction shown on FIG. 3 to selectively place vacuum source 125 in pressure communication with mold cavity 115, thereby controlling a vacuum pressure created in mold cavity 115. In different examples, vacuum line control cylinder 124 may be a single acting cylinder, which uses a compressible fluid to actuate vacuum line control rod 126 in one direction and a spring to return vacuum line control rod 126 to a return position, or a double acting cylinder, which uses a compressible fluid to both extend and return vacuum line control rod 126. In different assemblies according to the disclosure different vacuum control hardware may be used, and the disclosure is not limited in this respect.

From time to time, a pressurized gas may be applied to pitch in mold cavity 115 to help densify preform 113, e.g., during a VPI cycle. To control the pressurized gas, apparatus 100 may include gas control hardware connected to a pressurized gas source. In the example of FIG. 3, for instance, apparatus 100 includes gas feed control cylinder 130, gas control rod 132, and gas port 133. Gas port 133 connects gas source 129, which supplies pressurized gas, to mold cavity 115 that contains preform 113. In various examples, gas source 129 may be a source of pressurized inert gas including, but not limited to, nitrogen, helium, argon, carbon dioxide, or the like. Gas control rod 132 is connected to gas feed control cylinder 130. In operation, gas control rod 132 may be controllably actuated in the Z-direction shown on FIG. 3 to selectively place gas source 129 in fluid communication with mold cavity 115, thereby controlling a gas pressure created in mold cavity 115. In different examples, gas feed control cylinder 130 may be a single acting cylinder or a double acting cylinder, as discussed above with respect to vacuum line control cylinder 124. Further, as similarly discussed above with respect to the vacuum control hardware in apparatus 100, in different assemblies according to the disclosure, different features may be used to control pressurized gas flow to mold cavity 115, and the disclosure is not limited in this respect.

In addition to or in lieu of using pressurized gas to pressurize pitch in mold cavity 115, apparatus 100 may use pitch pressurization ram 122 to pressurize a pitch in mold cavity 115, e.g., during a RTM cycle. Pitch pressurization ram 122 may be a piston, plunger, or other device for applying a mechanical compression force to pitch. Pitch pressurization ram 122 is shown in an extended state in FIG. 3. In operation, pitch pressurization ram 122 may be controllably actuated back and forth in the Z-direction shown on FIG. 3. Upon being retracted, pitch pressurization ram 122 may define a ram cavity for receiving pitch. Pitch may be loaded into the ram cavity using a variety of loading forces including, e.g., a vacuum created by retracting pitch pressurization ram 122 or a pressure differential between pitch tank 142 and the ram cavity. In any event, upon loading the ram cavity, pitch pressurization ram 122 may be actuated forward (extended) to pressurize pitch in the ram cavity, injecting the pitch through a pitch injection port in mold 114 (not shown in FIG. 3).

Pitch pressurization ram 122 is connected to ram cylinder 120. Ram cylinder 120 functions to actuate pitch pressurization ram 122. Ram cylinder 120 extends through bolster 106, clamp plate 108A, insulating place 112A, and mold 114. In some examples, ram cylinder 120 may be a pneumatic cylinder for converting pneumatic power into mechanical power for actuating pitch pressurization ram 122. In other examples, ram cylinder 120 may be a hydraulic cylinder for converting hydraulic power into mechanical power for actuating pitch pressurization ram 122. In yet further examples, ram cylinder 120 may be replaced by a different mechanical actuating force such as, e.g., a ball and screw arrangement.

To control pitch delivery to mold cavity 115, apparatus 100 may also include pitch flow control features. For example, apparatus 100 includes pitch feed control cylinder 134, pitch control rod 136, and pitch port 137. Pitch port 137 provides a connection point between pitch tank 142 and mold cavity 115 that contains preform 113. Pitch control rod 136 is connected to pitch feed control cylinder 134. In operation, pitch control rod 136 may be controllably actuated in the Z-direction shown on FIG. 3 to selectively place pitch tank 142 in fluid communication a ram cavity (i.e., a void area created be retracting ram 122), which in turn is in fluid communication with mold cavity 115. In this manner, the flow of pitch to mold cavity 115 may be controlled. In different examples, pitch feed control cylinder 134 may be a single acting cylinder or a double acting cylinder, as discussed above with respect to vacuum line control cylinder 124 and gas fee control cylinder 130. Further, as also noted above with respect to the vacuum control features and the gas control features in apparatus 100, in different assemblies according to the disclosure, different features may be used to control pitch flow to mold 114, and the disclosure is not limited in this respect.

In the example of FIG. 3, pitch melt apparatus 102 supplies pitch port 137 with melted pitch. Pitch melt apparatus 102 includes pitch tank 142, pitch feed inlet 144, temperature control jacket 146, and pitch liquefaction system 148. Pitch discharge valve 140 connects pitch melt apparatus 102 to pitch port 137 of mold 114. Pitch tank 142 may receive solid pitch through pitch feed inlet 144. In some examples, temperate control jacket 146 may heat pitch tank 142. In other examples, pitch tank 142 may be heated using additional or different heating elements, such as, e.g., direct tank heating or internal tank heat coils. Pitch may liquefy as pitch tank 142 is heated above the melting point of the pitch in the tank.

After densifying preform 113, pressure may be released from press platens 104A and 104B to allow mold 114 to be opened. In some examples, mold 114 may be removed from apparatus 100 before opening the mold to extract a densified preform 113. In other examples, a portion of mold 114 may be opened while mold 114 resides in apparatus 100. For example, in FIG. 3, mold 114 may be opened in apparatus 100 on a parting line sealed by parting seal 160. To facilitate removal of a densified preform 113 in these examples, apparatus 100 may include ejector pins 118. Ejector pins 118 may be controllably actuated in the Z-direction shown in FIG. 3 to help eject preform 113 from mold 114.

In operation, apparatus 100 may be used to densify preform 113 in the same mold cavity 115 of mold 114 using one or more of a RTM cycle, a VPI cycle, a VRTM cycle, or combinations of these cycles, as described above with respect to apparatus 50 in FIG. 2. For example, apparatus 100 may densify preform 113 in mold cavity 115 via a RTM cycle. During a RTM cycle, preform 113 may be placed into mold cavity 115. Mold 114 may then be compressed between press platens 104A and 104B to seal mold cavity 115 for the densification cycle. Pitch may be melted by pitch melt apparatus 102, and in particular pitch tank 104, with heat supplied from temperature control jacket 146. Upon actuating pitch pressurization ram 122 into a retracted position, pitch discharge valve 140 may be opened and pitch feed control cylinder 134 may be controlled to actuate pitch control rod 136, thereby placing pitch tank 142 in fluid communication with a cavity created by the retracted pitch pressurization ram 122. After filling the ram cavity with pitch, pitch pressurization ram 122 may be actuated forward to apply a ram pressure to force pitch into mold cavity 115. As pitch enters mold cavity 115, air in the pores of preform 113 may evacuate, e.g., through vacuum port 128 or a separate vent port on mold 114 (not shown in FIG. 3). In this manner, preform 113 may be pitch densified via a RTM cycle within mold cavity 115 of apparatus 100.

Apparatus 100 may also be used to densify preform 113 using a VRTM molding cycle, as described with respect to FIG. 2. In a VRTM cycle, preform 113 may be placed into mold cavity 115 and pitch may be melted in pitch melt apparatus 102, as described above with respect to a RTM cycle. A pressure in mold cavity 115 may be reduced to vacuum by controlling vacuum line control cylinder 124 to actuate vacuum line control rod 126. Upon actuating vacuum line control rod 126, mold cavity 115 may be placed in pressure communication with vacuum source 125 through vacuum port 128. Pitch pressurization ram 122 may be retracted and a cavity created by the retracted pitch pressurization ram 122 filled with pitch. Thereafter, pitch pressurization ram 122 may be actuated forward to pressurize pitch in the ram cavity, injecting the pitch through a pitch injection port into mold cavity 115 and into the vacuum pressure conditions previously established in mold 114. In this manner, preform 113 may be pitch densified via a VRTM cycle within mold cavity 115 of apparatus 100.

Apparatus 100 may also be used to densify preform 113 using a VPI cycle, as also discussed with respect to FIG. 2. In a VPI cycle, preform 113 may be placed into mold cavity 115 and pitch may be melted in pitch melt apparatus 102, as described above with respect to a RTM cycle. A pressure in mold cavity 115 may be reduced to vacuum by controlling vacuum line control cylinder 124 to actuate vacuum line control rod 126. Upon actuating vacuum line control rod 126, mold cavity 115 may be placed in pressure communication with vacuum source 125 through vacuum port 128. Pitch pressurization ram 122 may be retracted and a cavity created by the retracted pitch pressurization ram 122 filled with pitch. As the cavity created by the retracted pitch pressurization ram 122 is in fluid communication with mold cavity 115 (e.g., through a pitch injection port in mold 114 not shown in FIG. 3) the vacuum in mold cavity 115 may draw the pitch from the ram cavity into mold cavity 115, thereby filling mold cavity 115 with pitch. With mold cavity 115 filled with pitch, vacuum line control cylinder 124 may be controlled to actuate vacuum line control rod 126 to close vacuum port 128. Thereafter, gas feed control cylinder 130 can be controlled to actuate gas control rod 132. Gas control rod 132 can actuate to open gas port 133, placing mold cavity 115 housing preform 113 in communication with pressurized gas source 129. In this manner, preform 113 may be pitch densified via a VPI cycle within mold cavity 115 of apparatus 100.

With the example features described above, apparatus 100 is configured to pitch density a preform using at least one of a RTM cycle, a VRTM cycle, or a VPI cycle. As described above with respect to apparatus 50 (FIG. 2), a specific pitch densification cycle may be selected for apparatus 100 based on an initial density of preform 113. In some examples, apparatus 100 may be configured to determine a density of preform 113 and automatically select a specific pitch densification cycle based on the determined density. Accordingly, apparatus 100 may include a scale (e.g., load cell) and/or any additional features to determine the weight, volume, or density of preform 113.

Apparatus 100, as outlined above, may include features for pitch densifying a carbon-based fiber preform using a pitch densification cycle selected from a plurality of different pitch densification cycles. As shown, apparatus 100 may be a modular assembly configured to be used with standard press platen 104A and 104B. That is, apparatus 100 may include different modular components configured to be assembled and inserted between press platens to form apparatus 100. In different examples, however, apparatus 100 may include different modular components or non-modular components in addition to or in lieu of the components illustrated and described with respect to FIG. 3. Therefore, although apparatus 100 includes various example components, different configuration are contemplated.

Figure 4:
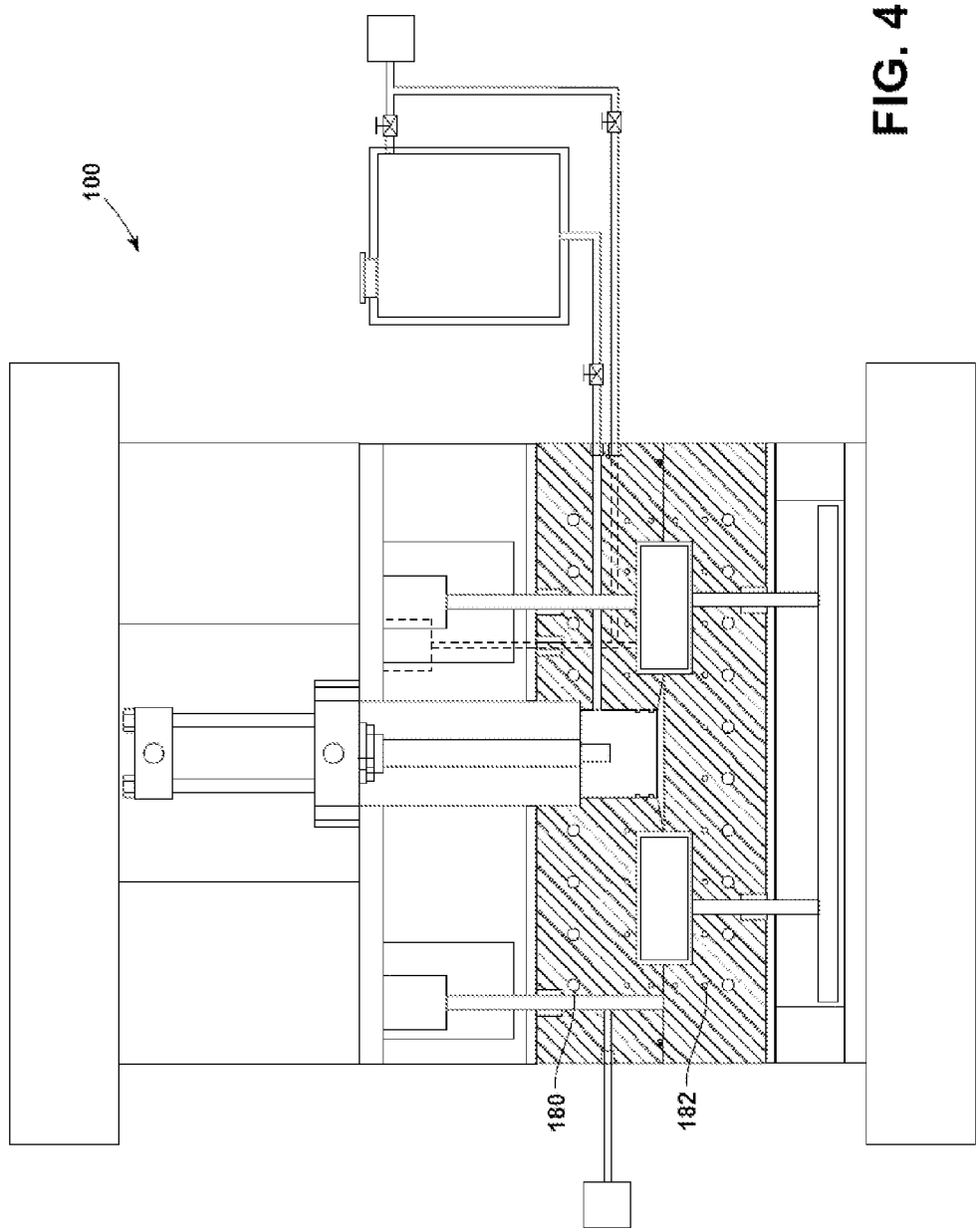
FIG. 4 is a schematic block diagram illustrating example features that may be included with the example pitch densification apparatus of FIG. 3.

As an example of the additional or different features that may be included in an apparatus according to the disclosure, FIG. 4 is a schematic diagram illustrating an example of apparatus 100 (FIG. 3) with example thermal management features for controlling the temperature of mold 114. Because pitch is generally solid at ambient temperatures, an apparatus that includes thermal management features may help melt pitch or keep pitch in a flowable state until pitch suitably permeates the various pores of preform 113. In other words, in examples where pitch is externally melted and conveyed to mold 114, as shown in FIG. 4, thermal management features may help keep the pitch in a flowable state until the pitch infiltrates the pores of preform 113 within mold cavity 115. Conversely, in examples where a portion of solid pitch is supplied in mold cavity 115 prior the start of a densification cycle, as described in greater detail with respect to FIG. 6, thermal management features may help increase the temperature of mold 114 until mold 114 is above the melting temperature of the pitch in the mold.

In the example of FIG. 4, apparatus 100 includes heater tubes 180 and cooling tubes 182 for heating and cooling, respectively, mold 114. Heater tubes 180 may extend through at least a portion of mold 114 and be in thermal communication with mold 114. Heater tubes 180 may define a conduit configured for fluid communication with a thermal transfer agent. A thermal transfer agent may include, but is not limited to, steam, oil, a thermal transfer fluid, or the like. Heater tubes 180 may be cast or machined into mold 114, or may be inserted into apertures defined by mold 114. Heater tubes 180 may be formed of a thermally conductive material including, but not limited to, copper, aluminum, and alloys thereof. In operation, a thermal transfer agent may be heated in apparatus 100 or externally to apparatus 100 (e.g., in a furnace or heat exchanger) and conveyed through heater tubes 180. The heat of the thermal transfer agent may conduct through heater tubes 180, mold 114, and preform 113. In this way, mold 114, including preform 113 and pitch in mold cavity 115, may be conductively heated by heater tubes 180. In various examples, a thermal transfer agent may be heated to a temperature greater than approximately 150 degrees Celsius, such as, e.g., a temperature greater than approximately 250 degrees Celsius during a pitch densification cycle of apparatus 100.

After completing one or more pitch densification cycles on apparatus 100, preform 113 may be saturated with liquid pitch and excess pitch may remain in mold cavity 115. To facilitate easy and rapid removal of a densified preform 113 from apparatus 100, cooling tubes 182 may be provided on apparatus 100 to cool and solidify melted pitch. In some examples, heater tubes 180 may be used as cooling tubes by conveying a comparatively cool thermal transfer agent through heater tubes 180 after densification. In other examples, however, apparatus 100 may include separate cooling tubes 182. Separate heating tubes 180 and cooling tubes 182 may allow apparatus 100 to operate faster than when apparatus 100 includes shared heating and cooling tubes by reducing thermal cycling times.

Cooling tubes 182 may be similar to heating tubes 180 in that cooling tubes 182 may extend through at least a portion of mold 114 and may be in thermal communication with mold 114. Cooling tubes 182 may also define an aperture configured for fluid communication with a thermal transfer agent, which may be the same thermal transfer agent received by heater tubes 180 or a different thermal transfer agent. In operation, the thermal transfer agent may be conveyed through cooling tubes 182. As a result, mold 114, including preform 113 and pitch in mold cavity 115, may be conductively cooled by cooling tubes 182.

Figure 5:
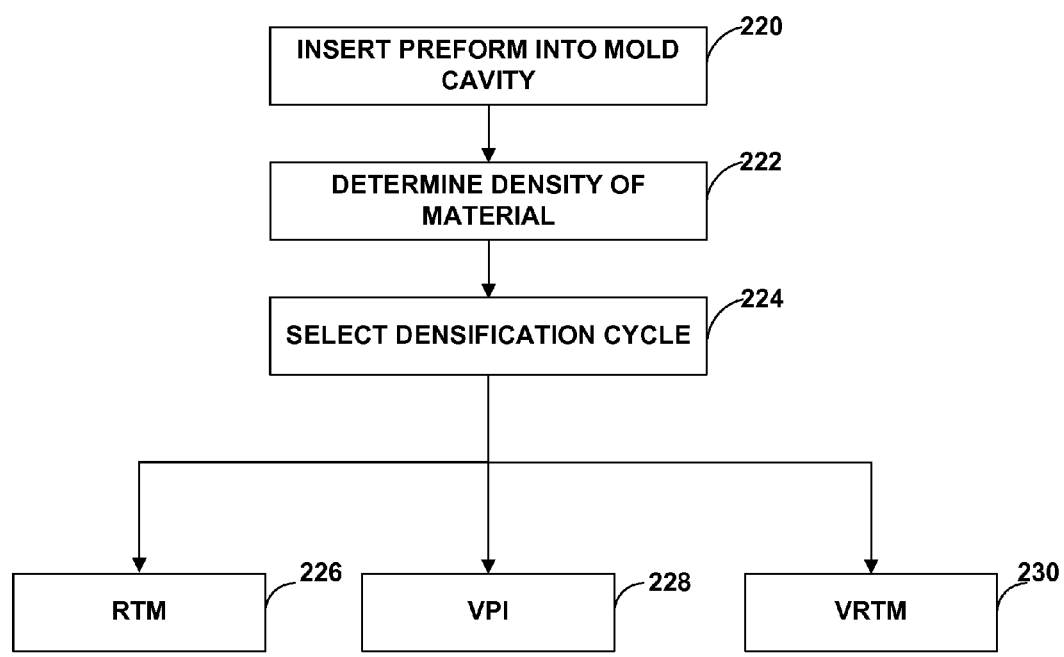
FIG. 5 is a flow diagram illustrating an example method for densifying a material with pitch using the example apparatus of FIG. 3.

Different pitch densification apparatuses and pitch melt techniques have been described in relation to FIGS. 2-4. FIG. 5 is a flow chart illustrating an example method for densifying a material with an apparatus configured to densify a material according to one or more densification techniques selected from a plurality of different densification techniques. For ease of description, the method of FIG. 5 for pitch densifying a material with an apparatus configured to operate according to a plurality of different pitch densification cycles is described as executed by apparatus 100 (FIGS. 3 and 4). In other examples, however, the method of FIG. 5 may be executed by apparatus 50 (FIG. 2) or apparatuses with different configurations, as described herein.

As shown in FIG. 5, preform 113 may be inserted into mold cavity 115 of a densification apparatus (220), and the initial density of preform 113 may be determined (222). Based at least part on the density of preform 113 (222), a densification cycle may be selected (224). In accordance with the selected cycle (224), apparatus 100 may then carry out one or more of a RTM cycle (226), a VPI cycle (228), and/or a VRTM cycle (230) on preform 113 within mold 114.

The technique of FIG. 5 includes inserting preform 113 into mold cavity 115 of pitch densification apparatus 100 (220). In different examples, mold 114 may be removable from pitch densification apparatus 100 or integrally formed with pitch densification apparatus 100. Preform 113 or other material to be densified by apparatus 100 may be a carbon-based fiber material, a carbon-based non-fiber material, or a non-carbon-based material. In some examples, the material may be a woven or non-woven layered material. A plurality of different layers of the layered material may be stacked on top of one another. The plurality of different layers may be shaped, needled, and/or otherwise mechanically affixed together to define preform 113. In one example, preform 113 may define a shape generally corresponding to finished brake rotor disc 36 or finished brake stator disc 38 (FIG. 1). In another example, preform 113 may define a shape generally corresponding to finished beam key 40 for securing a finished brake disc rotor to a wheel assembly. In yet other examples, preform 113 may define different shapes, as will be appreciated by those of ordinary skill in the art.

The technique of FIG. 5 includes determining an initial density of a material to be densified (222). An initial density may be indicative of the initial strength of the material and may indicate the ability of the material to withstand a specific densification technique. In some examples, an initial density of the material may be determined outside of densification apparatus 100 prior to inserting the material into mold cavity 115 of apparatus 100 (220). In other examples, the initial density of the material may be determined by densification apparatus 100 after inserting the material into mold cavity 115 of apparatus 100 (220). Pitch densification apparatus 100 may include, e.g., a scale, density meter, or other features for determining the initial density of the material.

After determining an initial density of preform 113 (222), one or more of a plurality of different densification cycles (RTM, VRTM, and/or VPI) can be selected to densify preform 113. The one or more of the plurality of different densification cycles may be manually selected (e.g., by an operator) or automatically selected (e.g., by densification apparatus 100). Further, the one or more of the plurality of different densification cycles may be selected based on a variety of different factors including, e.g., operating cycle times for each of the different densification cycles, the preprocessing steps performed on the material to be densified, the cost associated with each densification cycle, or other factors. According to example of FIG. 5, however, the technique includes selecting a densification cycle based on the determined density (224). In some examples, a processor of apparatus 100 may compare the determined density to one or more thresholds density values stored in a memory associated with apparatus 100. In other examples, a processor of apparatus 100 may compare the determined density to one or more threshold ranges stored in a memory associated with densification apparatus 100. In either set of examples, different thresholds or threshold ranges may correspond to different density thresholds that allow preform 113 to withstand a force associated with one or more of RTM, VRTM, and VPI, as discussed above with respect to FIG. 2. Accordingly, a processor of apparatus 100 may select a specific densification cycle by comparing the determined density to one or more thresholds or threshold ranges.

Based on the selected densification cycle, apparatus 100 may densify the material in mold cavity 115 according one or more of a RTM cycle (226), a VPI cycle (228), and/or a VRTM cycle (230). During a RTM cycle (226), for example, pitch may be melted in pitch melt apparatus 102 and conveyed to apparatus 100. Alternatively, one or more heating features may operate to melt solid pitch within mold cavity 115, as described in greater detail with reference to FIG. 6. In either case, pitch pressurization ram 122 may be actuated into a retracted position during RTM cycle (226). Melted pitch may fill a cavity created by the retracted pitch pressurization ram 122. Thereafter, pitch pressurization ram 122 may be actuated forward to apply a ram pressure to force pitch into mold cavity 115. In some examples, pitch pressurization ram 122 may apply a ram pressure between approximately 500 psi and approximately 5000 psi. As a result, pressurized pitch may infiltrate the different pores of the material in mold cavity 115. In this manner, apparatus 100 may densify the material via RTM cycle (226).

In VRTM cycle (230), a pressure in mold cavity 115 may be reduced to vacuum by controlling vacuum line control cylinder 124 to actuate vacuum line control rod 126, thereby placing mold cavity 115 in fluid communication with vacuum source 125. Thereafter, pitch pressurization ram 122 may be retracted and a cavity created by the retracted pitch pressurization ram 122 filled with pitch. Pitch may be melted in pitch melt apparatus 102 and conveyed to apparatus 100. Alternatively, pitch may be melted directly in mold cavity 115. As with resin transfer molding cycle (226), forward actuation of pitch pressurization ram 122 may pressurize pitch in the ram cavity, injecting the pitch through a pitch injection port in mold 114 into the vacuum pressure conditions previously established in mold cavity 115. In this manner, apparatus 100 may densify the material via a VRTM cycle (230).

During a VPI cycle (228), a pressure in mold cavity 115 may be reduced to vacuum by controlling vacuum line control cylinder 124 in apparatus 100 to actuate vacuum line control rod 126, thereby placing mold cavity 115 in fluid communication with vacuum source 125. Pitch may flood mold cavity 115 during the vacuum cycle. For example, pitch may be conveyed from melt apparatus 102 to mold cavity 115 during the vacuum cycle. Alternatively, pitch may be melted in mold cavity 115 during the vacuum cycle to flood mold cavity 115. In either example, with mold cavity 115 filled with pitch, the vacuum line may be closed and gas feed control cylinder 130 controlled to actuate gas control rod 132. Actuation of gas control rod 132 may place mold cavity 115 in communication with pressurized gas source 129. The pressurized gas may cause melted pitch in mold cavity 115 to infiltrate the different pores of the material to be densified. In this manner, apparatus 100 may densify material in mold cavity 115 with a VPI cycle (228).

Preform 113 may be densified with a single cycle of RTM (226), VPI 228), or VRTM (230). Alternatively, preform 113 may be densified with multiple cycles of RTM (226), VPI (228), and/or VRTM (230) without being removed from mold cavity 115 of apparatus 100. The same RTM (226), VPI (228), and/or VRTM (230) cycle may be repeatedly performed on apparatus 100 to densify preform 113, or at least one cycle of one densification process (i.e., RTM (226), VPI (228), VRTM (230)) used to densify preform 113 may be different than at least one other cycle of one other densification process used to densify preform 113, while preform 113 is housed within mold cavity 115.

In this respect, in some examples, the techniques of FIG. 5 may be repeated after a first cycle of densification on apparatus 100 by again determining the density of preform 113 in apparatus 100 after a cycle of densification (222). In some examples, a processor of apparatus 100 may compare the determined density to one or more thresholds density values or ranges of threshold values stored in a memory associated with apparatus 100. The different thresholds or threshold ranges may correspond to different density thresholds that allow preform 113 to withstand a force associated with one or more of RTM, VRTM, and VPI, as discussed above. Accordingly, a processor of apparatus 100 may select a densification cycle (RTM, VRTM, and/or VPI) by comparing the determined density to one or more thresholds or threshold ranges. The densification process may be the same process used for a first densification cycle on preform 113, or the densification process may be different than the densification process used for the first densification cycle on preform 113.

In some examples, different densification processes may be used to densify preform 113 without removing preform 113 from mold cavity 115. For example, a processor of apparatus 100 may determine a density of preform 113 (222) and compare the determined density to one or more threshold density values or range of density values stored in a memory associated apparatus 100. Based on the comparison, apparatus 100 may select a RTM cycle, a VRTM cycle, and/or a VPI cycle to pitch densify preform 113 (224). After performing the selected pitch densification cycle, the processor of apparatus 100 may again determine the density of preform 113 (222) and compare the determined density to one or more threshold density values stored in a memory associated apparatus 100. Based on this further comparison (224), the processor of apparatus 100 may determine that one or more additional cycles of pitch densification are warranted. The processor of apparatus 100 may then select one or more additional pitch densification cycles to perform on preform 113 based on the threshold comparison, and the one or more cycles may be the same or may be different than the initial pitch densification cycle. In this manner, apparatus 100 may change pitch densification processes to adapt to the changing density of preform 113 without removing preform 113 from mold 114. Alternatively, after comparing a determined density of preform 113 to one or more thresholds, apparatus 100 may determine that preform 113 has reached a suitable density and that no further densification is necessary. In some examples, preform 113 may undergo pitch densification until preform 113 reaches a density between approximately 1.6 g/cc and approximately 1.7 g/cc.

By pitch densifying a material according to one of a plurality of different selectable pitch densification cycles, the technique of FIG. 5 may allow apparatus 100 to densify materials that exhibit different physical characteristics. In some examples, this may allow weak materials that may otherwise by discarded to be processed using lower force densification techniques. In additional examples, this may allow for the fabrication of low cost C—C composite materials, e.g., by eliminating material waste, by eliminating the capital costs associated with multiple densification machines, and by eliminating processing steps during the fabrication of C—C composite material.

Techniques for pitch densifying a material using a selectable one of a plurality of different pitch densification processes have been described. In additional examples according to the disclosure, techniques are provided for pitch densifying a material using an apparatus that includes a mold configured to receive both a material to be densified and a portion of solid pitch material. The apparatus may be the same as the apparatuses described above or the apparatus may be different. In some examples, the apparatus is configured to heat the solid portion of pitch material beyond the melting temperature of the pitch material. As a result, the apparatus may melt pitch in-situ. By melting pitch in-situ, a low cost apparatus without external pitch melting equipment may be provided. Furthermore, by providing a portion of solid pitch material, a material may be densified with a precise amount of pitch, resulting in a high performance C—C composite component manufactured within tight pitch tolerances.

Figure 6:
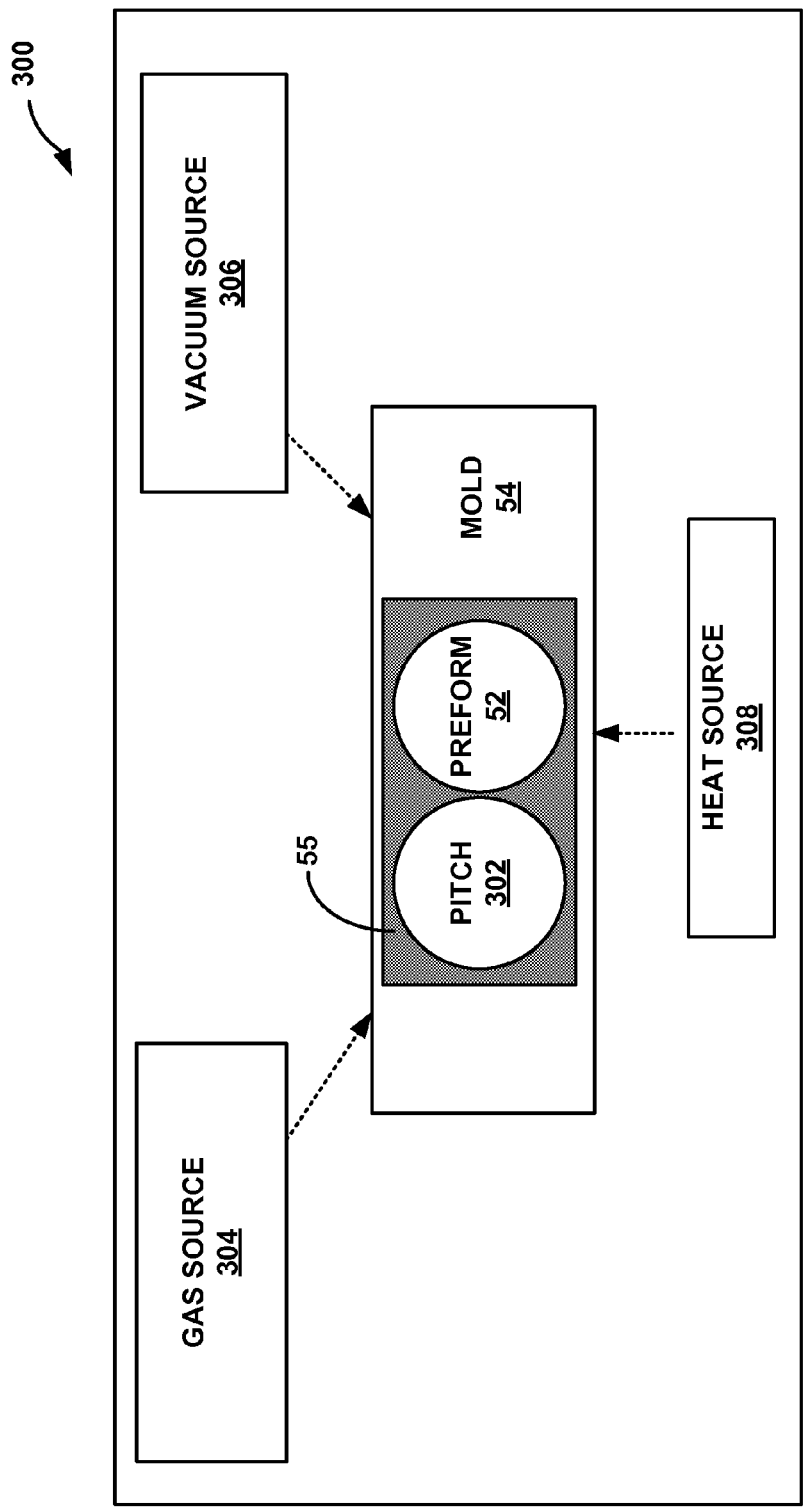
FIG. 6 is a conceptual block diagram illustrating another example pitch densification apparatus that includes a mold configured to receive a preform and a portion of solid pitch.

FIG. 6 is a conceptual block diagram illustrating an example pitch densification apparatus 300 in accordance with the disclosure that includes a mold configured to receive a material to be densified and solid pitch. In particular, FIG. 6 illustrates apparatus 300 including preform 52, mold 54, solid pitch 302, gas source 304, vacuum source 306, and heating source 308. Mold 54 defines mold cavity 55. Preform 52 and solid pitch 302 may be inserted into mold cavity 55 for pitch densification. Heating source 308 is thermally coupled to mold 54 and, in particular, solid pitch 302 in mold cavity 55. Heating source 308 is configured to heat solid pitch 302 above a melting temperature of solid pitch 302. Gas source 304 is connected to mold 54 and configured to apply a gas pressure in mold cavity 55 to force melted pitch into preform 52 to densify the preform. Vacuum source 306 is connected to mold 54 and configured to create a vacuum pressure in mold cavity 55 at least prior to application the gas pressure from gas source 304.

As described in greater detail below, apparatus 300 is configured to pitch densify preform 52 without using external pitch melting equipment. Preform 52 and a portion of solid pitch 302 may be inserted into mold cavity 55 defined by mold 54 of apparatus 300. In some examples, preform 52 and the portion of solid pitch 302 may be separate. In some examples, the portion of solid pitch 302 may define a shape substantially corresponding to a shape of mold cavity 55. Heating source 308 may heat mold 54, and in particular solid pitch 302, above a melting temperature of solid pitch 302 to fill mold cavity 55 with melted pitch. Further, apparatus 300 may apply one or more driving forces to force the melted pitch into the different pores of preform 52 while preform 52 resides in cavity 55, thus producing a densified material. In different examples, apparatus 300 may be configured to densify preform 52 with a portion of solid pitch 302 using one or more of a RTM cycle, a VRTM cycle, or a VPI cycle, e.g., as described above with respect to FIGS. 2 and 3. For ease of description, however, apparatus 300 in the example of FIG. 6 is shown with gas source 304 and vacuum source 306, which may each be used singly or may be used in combination, e.g., during a VPI cycle.

Apparatus 300 is configured to receive a material to be densified, which in the example of FIG. 6 is shown as preform 52 (FIG. 2). As described above, preform 52 may be a carbon-based fiber material. The carbon-based fiber material may be arranged as a plurality of stacked layers. The plurality of stacked layers may or may not be needled together. In addition, preform 52 may or may not undergo chemical vapor deposition prior to being inserted into mold cavity 55. Preform 52 may define a general shape of a desired finished component including, e.g., a general shape of rotor disc 36, stator disc 38, beam key 40, or another component of aircraft brake assembly 10 (FIG. 1).

Preform 52 is inserted into mold cavity 55 of mold 54 along with solid pitch 302. Solid pitch 302 is an example of pitch 56, described with respect to FIG. 2. Solid pitch 302 may be cold (e.g., at ambient temperatures) or solid pitch 302 may be heated, e.g., to reduce heating time on apparatus 300. In general, when solid pitch 302 is heated prior to being inserted into mold cavity 55, solid pitch 302 is heated to a temperature below the melting temperature of solid pitch 302. In other words, solid pitch 302 is in a solid state when placed in mold cavity 55. In this manner, solid pitch 302 may be easily handled and controllably measured, e.g., to place a precise amount of pitch into mold cavity 55.

In some examples, solid pitch 302 may be placed in mold cavity 55 with preform 52. The solid pitch 302 may be placed in mold cavity 55 prior to or after placing preform 52 in mold cavity 55. For example, solid pitch 302 may be placed in mold cavity 55 and then preform 52 may be placed on top of solid pitch 302. Alternatively, preform 52 may be placed in mold cavity 55 and solid pitch 302 may be placed on top of preform 52. In another example, solid pitch 302 may be placed around a side of preform 52. Regardless of the specific arrangement, the single portion of solid pitch 302 may melt during the operation of apparatus 300 to flood mold cavity 55 with melted pitch.

Solid pitch 302 may be a single piece of pitch or divided into multiple portions of solid pitch. As described in greater detail with reference to FIG. 8, in some examples, multiple portions of solid pitch 302 (e.g., two, three, four, or more) may be placed in mold cavity 55. Different portions of the multiple portions of solid pitch 302 may be arranged next to each other, or different portions may be separated from one another, e.g., by preform 52. For example, different portions of solid pitch 302 may be arranged around different surfaces of preform 52 (e.g., a top and bottom surface of preform 52, or top, bottom, and side surfaces of preform 52, or different hemispheres of preform 52). In some examples, arranging different portions of solid pitch 302 around preform 52 may result in a substantially uniform distribution of melted pitch around preform 52 after melting solid pitch 302. This may produce a C—C composite material with a more uniform density than a C—C composite material manufactured with a single portion of solid pitch material.

Independent of the specific number of portions of solid pitch 302 placed into mold cavity 55, in some examples, solid pitch 302 and preform 52 may be separate components when inserted in mold cavity 55. In other words, in various examples, solid pitch 302 and preform 52 may be separate components that may be separately placed in mold cavity 55 or connected components that may be separate in the sense that solid pitch 302 and preform 52 are not materially integrated. By separating solid pitch 302 from preform 52, preform 52 may undergo different processing steps, e.g., needling, charring, or chemical vapor deposition, that would otherwise melt or physically disturb solid pitch 302 without pressurizing the pitch in a bounded area to pitch densify preform 52. Moreover, in some examples, providing solid pitch 302 separate from preform 52 may allow an existing mold 54 or an existing apparatus 300 to be adapted to the techniques of this disclosure without requiring additional capital costs. That being said, in other examples, solid pitch 302 and preform 54 may be integrated into a single component that may be inserted into mold cavity 55. In one example, solid pitch 302 may be mixed with carbon-based fibers used to form preform 52 prior to forming preform 52. In another example, one or more layers of solid pitch 302 may be inserted between one or more layers of carbon-based material used to form preform 52, thereby forming an integrated component of carbon-based fiber and solid pitch. Additional examples are possible.

Solid pitch 302 may define any suitable size and shape. In some examples, solid pitch 302 may be a powder. In other examples, solid pitch 302 may have a defined shape. Solid pitch 302 may be a block of pitch material, a disc of pitch material, rods of pitch material, pellets of pitch material, or any other shape. In some examples, as described in greater detail with respect to FIGS. 7A and 7B, solid pitch 302 may define a shape substantially corresponding to a shape of mold 54 such as, e.g., a shape substantially corresponding to a cross-sectional shape of mold cavity 55. When solid pitch 302 defines a shape substantially corresponding to a cross-sectional shape of mold cavity 55, solid pitch 302 may, in some examples, be comparatively thinner than when solid pitch 302 defines a different shape. A thinner solid pitch 302 may, in some cases, melt faster than a comparatively thicker solid pitch 302, e.g., facilitating faster cycling times on apparatus 300.

In some examples, mold cavity 55 defines a shape corresponding to a general shape of a desired finished component (e.g., as described with respect to preform 52). Example finished components include, but are not limited to, rotor disc 36, stator disc 38, and beam key 40 (FIG. 1). Because solid pitch 302 may, in some examples, defines a shape substantially corresponding to a cross-sectional shape of mold cavity 55, solid pitch 302 may also define a shape corresponding to a general shape of a desired finished component.

Figure 7A:
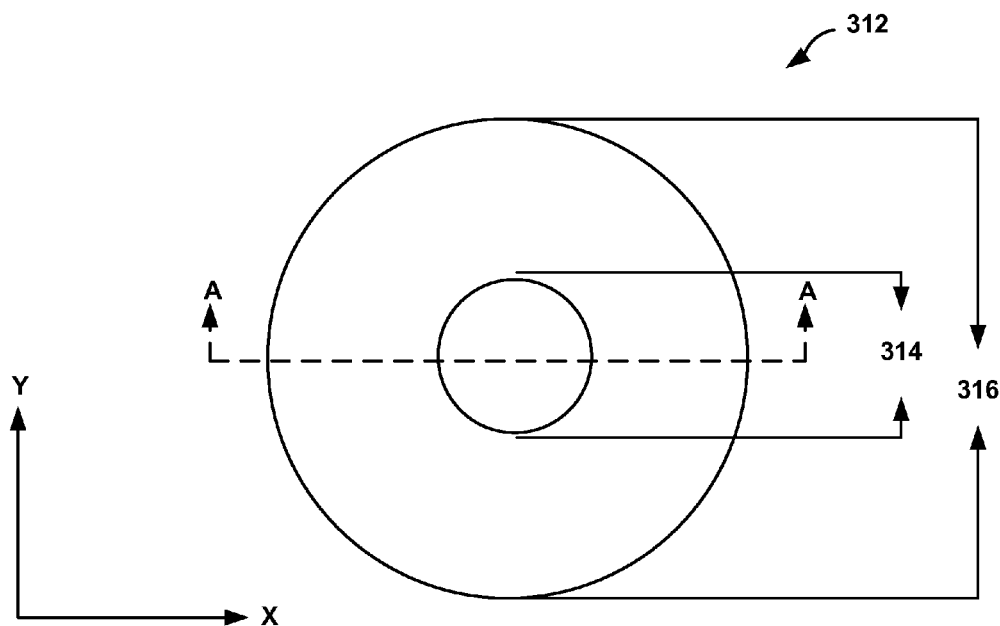
FIGS. 7A and 7B are conceptual diagrams illustrating an example portion of solid pitch from different views.
Figure 7B:
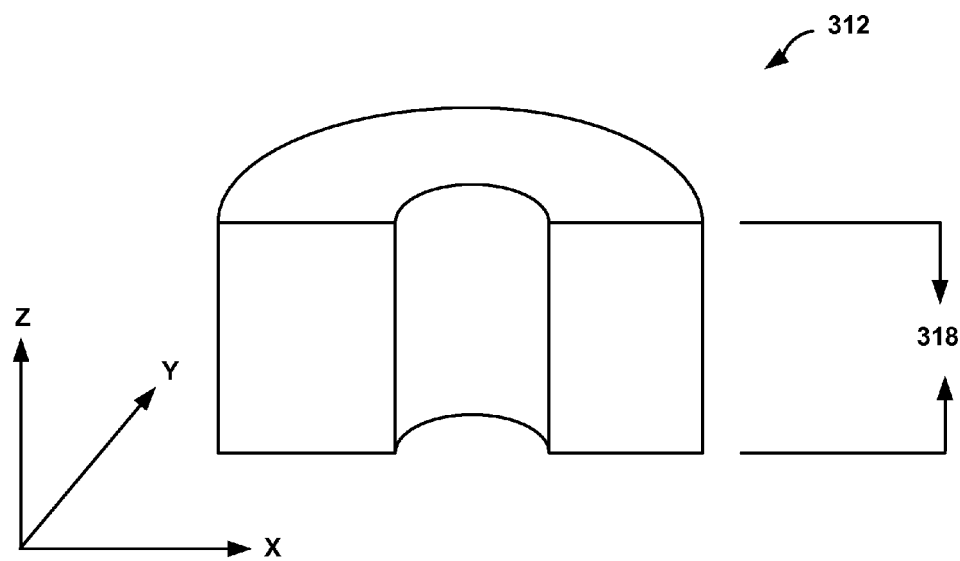

In one example, rotor disc 36 and/or stator disc 38 may define an annular cross-sectional shape. An annular cross-sectional shape may facilitate placement of rotor disc 36 and/or stator disc 38 in aircraft brake assembly 10 (FIG. 1). Accordingly, solid pitch 302 may also, in some examples, define an annular shape. FIGS. 7A and 7B are conceptual diagrams illustrating an example in which solid pitch 302 has an example annular shape 312. FIG. 7A illustrates annular shape 312 in the X-Y cross-sectional plane. FIG. 7B illustrates annular shape 312 in a corresponding X-Z cross-sectional plane taken alone the A-A cross-sectional line shown on FIG. 7A.

In the X-Y cross-sectional plane shown on FIG. 7A, solid pitch 302 forms a ring that defines annular shape 312. Annular shape 312 includes inner diameter 314 and outer diameter 316. The specific dimensions for annular shape 312 may vary, e.g., based on the size of rotor disc 36 and/or stator disc 38. However, in some examples, solid pitch 302 may define annular shape 312 with inner diameter 314 between approximately 6 inches and approximately 13 inches. In some examples, solid pitch 302 may define annular shape 312 with outer diameter 316 between approximately 9 inches and approximately 25 inches. Other values and shapes are contemplated, however, and is should be appreciated that the disclosure is not limited to using a solid pitch that has any particular size or that defines any particular shape.

While the disclosure is not limited to a solid pitch 302 that has any particular dimensions, as briefly noted above, in some examples, a thinner solid pitch 302 may melt faster than a comparatively thicker solid pitch 302. Accordingly, solid pitch 302 may have controlled thickness dimensions. Thickness dimensions for solid pitch 302 may, in some examples, be measured in a direction orthogonal to a cross-sectional plane defining a shape for solid pitch 302. For example, with respect to solid pitch 302 defining annular shape 312 in the example of FIG. 7A, a thickness of solid pitch 302 may be measured in the Z-direction shown on FIG. 7B. As seen in the example of FIG. 7B, solid pitch 302 may define thickness 318 in the Z-direction illustrated. In some examples, solid pitch 302 may define a thickness 318 between approximately 0.25 inches and approximately 1.0 inch. Other values according to the disclosure are possible though. Further, it should be appreciated that although thickness 326 is described with respect to FIG. 7B, other solid pitches according to the disclosure may define thickness 326, or a different thickness, regardless of the specific cross-sectional shape the pitch defines in the X-Y cross-sectional plane.

Independent of the specific shaped defined by solid pitch 302, solid pitch 302 may be shaped using any variety of techniques. In one example, prior to being inserted into mold cavity 55, pitch may be liquefied, poured into a mold, and cooled to define a shape for solid pitch 302. In another example, a portion of solid pitch may be milled to define a shape for solid pitch 302. In a further example, pitch may be resin transfer molded to define a shape for solid pitch 302. Resin transfer molding may be accomplished on a dedicated resin transfer molding apparatus. Alternatively, in examples where a pitch densification apparatus is configured to pitch densify a material using a resin transfer molding cycle (e.g., apparatuses 50 and 100 described above with respect to FIGS. 2 and 3, respectively) a pitch may be molded on a pitch densification apparatus to define a specific shape for solid pitch 302 using the apparatus. In other words, the pitch densification apparatus may be used to mold a billet of solid pitch 302 in addition to, or in lieu of, being used to later pitch densify a material with the molded portion of solid pitch 302.

For example, with reference to FIG. 3 for ease of description, pitch densification apparatus 100 may be used to mold a portion of solid pitch 302 that defines a shape of mold 114.

Pitch may be melted in pitch melt apparatus 102 and conveyed to apparatus 100. Pitch pressurization ram 122 may be retracted to define a cavity for receiving the melted pitch. Without preform 113 in mold cavity 115, pitch pressurization ram 122 may be actuated forward to inject pressurized pitch into mold cavity 115 of mold 114. After allowing the injected pitch to cool and solidify, solid pitch 302 may be removed from mold 114. In this manner, pitch may be resin transfer molded on pitch densification apparatus 100 to form solid pitch 302 that defines a shape substantially corresponding to a shape of mold cavity 115. In different examples, solid pitch 302 may be resin transfer molded on different pitch densification apparatuses, including those described in this disclosure. It should be appreciated, however, that alternative techniques can be used to form solid pitch 302, and the disclosure is not limited to any particular techniques for forming solid pitch 302.

Using solid pitch 302 in pitch densification apparatus 300 (FIG. 6), in accordance with this disclosure, may allow preform 52 to be densified with a precisely controlled amount of pitch. Unlike pitch densification techniques that require transferring melted pitch, pitch densification using a portion of solid pitch 302 may not involve pitch loss during transfer or melted pitch measuring errors. Rather, solid pitch 302 may be precisely weighed and the weight of solid pitch 302 adjusted before being inserted into mold 54. In this manner, the amount of pitch supplied to a particular component may be controlled within a narrow range of tolerances.

In general, any suitable amount of solid pitch 302 may be inserted into mold cavity 55 with preform 52. The amount of solid pitch 302 inserted into mold cavity 55 may vary based on a variety of factors including, e.g., the size of preform 52, the characteristics of solid pitch 302, and the desired density for a finished C—C composite component. Further, it should be appreciated that the amount of solid pitch 302 may vary with the number of preforms 52 inserted into mold cavity 55. Accordingly, if mold 54 is configured to receive multiple preforms 52 (e.g., two, three, four, or more), the amount of solid pitch 302 inserted into mold cavity 55 may increase.

As noted with reference to FIG. 6, mold 54 is configured to receive preform 52 and solid pitch 302. Mold 54 may have a variety of different configurations and may be formed of a variety of different materials (as discussed with respect to FIG. 2). Further, the specific shape and size of mold 54 may vary, e.g., based on the shape and size of preform 52, the shape and size of solid pitch 302, and the number of portions of solid pitch 302 intended to be added to mold 54.

Figure 8:
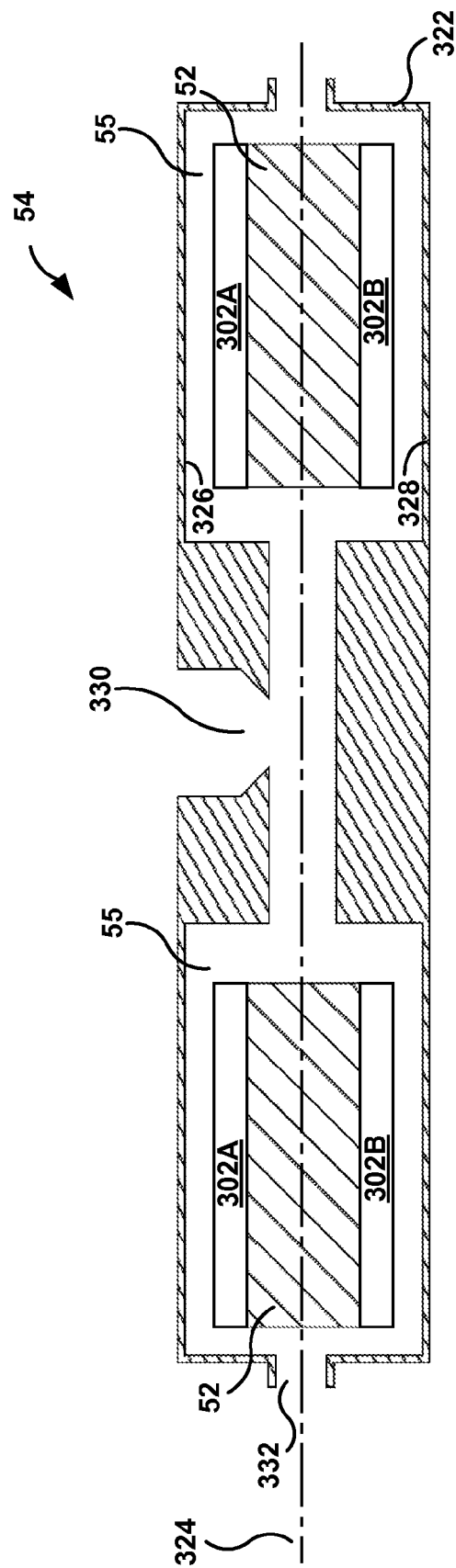
FIG. 8 is a conceptual diagram illustrating an example mold that may be used in the example apparatus of FIG. 6.

FIG. 8 is a conceptual diagram illustrating a cross-section of one example of mold 54 in accordance with the disclosure. As depicted in the example of FIG. 8, mold 54 includes mold cavity 55 that is defined between first portion 320 and second portion 322, which are separable at parting line 324, e.g., to open mold 54 for adding or removing solid pitch 302 and preform 52. Mold 54 includes top surface 326, bottom surface 328 opposite top surface 326, pressure port 330, and vent ports 332. Pressure port 330 is in fluid communication with gas source 304 to receive pressurized gas. Vent ports 332 may be in fluid communication with vacuum source 306 to create a vacuum pressure in mold cavity 55 or, e.g., a venting line to vent air in preform 52 as melted pitch infiltrates the pores of preform 52. Within mold cavity 55 in the example of FIG. 8 are first portion of solid pitch 302A, second portion of solid pitch 302B, and preform 52, which is shown as an annular shaped preform 52. First portion of solid pitch 302A is adjacent top surface 326, second portion of solid pitch 302B is adjacent bottom surface 328, and preform 52 is interposed between first portion of solid pitch 302A and second portion of solid pitch 302B. By interposing preform 52 between first portion of solid pitch 302A and second portion of solid pitch 302B, different surfaces of preform 52 may be exposed to substantially similar amounts of melted pitch after solid pitch 302 melts. This may improve the uniformity with which preform 52 is densified.

In general, mold 54, and in particular mold cavity 55 of mold 54, may be configured to receive preform 52 with any size or shape. Mold cavity 55 may also be configured to receive any number of portions of solid pitch 302. In some examples, mold cavity 55 is defined by a recessed area in top surface 326, bottom surface 328, and/or another surface of mold 54 to accommodate both solid pitch 302 and preform 52 in mold cavity 55.

After inserting solid pitch 302 and preform 52 into mold cavity 55, solid pitch 302 may be heated above the melting temperature of solid pitch 302 by heating source 308. Heating source 308 is thermally coupled to mold 54 and, in particular, solid pitch 302 in mold cavity 55 of mold 54. As used in this disclosure, the phrase "thermally coupled" means that heating source 308 is arranged such that thermal energy provided by heating source 308 may transfer to mold 54 during operation of apparatus 300.

In general, heating source 308 may be any source or sources of thermal energy that may operate to increase the temperature of solid pitch 302 above the melting temperature of solid pitch 302. For example, heating source 308 may be a convection heating source, an electromagnetic induction heating source, or an infrared heating source. In some examples, heating source 308 may include heating tubes 180 (FIG. 4). A thermally transfer agent may be heated in apparatus 300 or conveyed to apparatus 300 (e.g., from an external furnace, heat exchange, or the like) and passed through heater tubes 180. As a result, thermal energy may be conductively transferred from the thermal transfer agent, through heater tubes 180, through mold 54, and into solid pitch 302, thereby increasing the temperature of solid pitch 302. In other examples, different heating sources may be used in addition to or in lieu of heating tubes 180. For example, heating source 308 may be a fired burner or an electrical resistance heater. In still other examples, heating source 308 may be a radio frequency energy source (e.g., microwave energy source) that heats solid pitch 302 with radio frequency energy. In additional examples, heating source 308 may be an induction heater that inductively heats mold 54, which in turn heats solid pitch 302. For example, heating source 308 may be an electromagnetic induction heater configured to operate in the range of approximately 350 hertz to approximately 600 hertz, such as, e.g., between approximately 400 hertz and approximately 560 hertz, although operating ranges are possible. Additional or different heating sources may be used in an apparatus according to the disclosure.

Heating source 308 is configured to heat solid pitch 302 above the melting temperature of solid pitch 302 within mold cavity 55 of mold 54. The melting temperature of solid pitch 302 may vary based on the chemical composition of the specific solid pitch inserted into mold cavity 55 of mold 54. That being said, in some examples, solid pitch 302 may exhibit a melting/softening temperature between approximately 110 degrees Celsius and approximately 330 degrees Celsius. As such, heating source 308 may, in some examples, be configured to heat solid pitch 302 to a temperature greater than 110 degrees Celsius such as, e.g., to a temperature between approximately 285 degrees Celsius and approximately 330 degrees Celsius.

Apparatus 300 may apply one or more driving forces to force melted pitch into the different pores of preform 52 in order to densify preform 52 while preform 52 resides in mold cavity 55. In some examples, a driving force may be a pressurized ram force (e.g., pitch pressurization ram 122 shown in FIG. 3). For example, as solid pitch 302 melts in mold cavity 55, pitch pressurization ram 122 may be actuated against mold 54 (e.g., in the z-direction illustrated in FIG. 3) to compress mold 54 and the melted pitch in mold cavity 55. In this manner, melted pitch in mold cavity 55 may be pressurized, causing the pitch to infiltrate the different pores of preform 52 to densify preform 52. In other examples, different pitch driving forces may be used in addition to, or in lieu of, pitch pressurization ram 122.

In the example of FIG. 6, apparatus 300 is configured to densify preform 52 using one or both of gas source 304 and vacuum source 306. Gas source 304 and vacuum source 306 are in fluid communication with mold cavity 55, e.g., to control the pressure in mold cavity 55. In some examples, vacuum source 306 is configured to create a vacuum pressure in mold cavity 55 before solid pitch 302 melts in mold cavity 55 or while solid pitch 302 is melting in mold cavity 55. By creating a vacuum in mold cavity 55 before or while solid pitch 302 melts in mold cavity 55, melting pitch may be drawn into the different pores of preform 52, thereby densifying preform 52. In some additional examples, gas source 304 is configured to apply a gas pressure in mold cavity 55 to force melted pitch into the different pores of preform 52 to densify preform 52. Gas source 304 may be a source of pressurized inert gas including, but not limited to, nitrogen, helium, argon, carbon dioxide, or the like. Gas source 304 may apply a gas pressure in mold cavity 55 before or after solid pitch 302 melts, or while solid pitch 302 is melting in mold cavity 55. The gas pressure may pressurize the pitch in mold cavity 55 to densify preform 52.

In still other examples, apparatus 300 may be configured to use gas source 304 and vacuum source 306 in combination, e.g., during a VPI cycle, as described above with respect to FIGS. 2 and 3. Vacuum source 306 may create a vacuum in mold cavity 55 at least prior to the application of gas source 304, e.g., while solid pitch 302 is melting. After mold cavity 55 is flooded with melted pitch, vacuum source 306 may be disengaged and gas source 304 may be activated to pressurized the melted pitch in mold cavity 55. In this manner, apparatus 300 may be configured to densify preform 52 while preform 52 is housed in mold cavity 55 using at least one VPI cycle.

The gas pressure created in mold cavity 55 by gas source 304 and the vacuum pressure created in mold cavity 55 by vacuum source 306 may vary, e.g., based on the size of preform 52, a desired density of preform 52, and the specific solid pitch inserted into mold cavity 55. However, in some examples, gas source 304 may be configured to apply a gas pressure in mold cavity 55 between approximately 10 pounds per square inch (psi) and approximately 1000 psi, such as, e.g., between approximately 300 psi and approximately 700 psi. In some examples, vacuum source 306 may be configured to create a vacuum pressure in mold cavity 55 between approximately 1 torr and approximately 100 torr. Other pressures are possible though, and the disclosure is not limited in this respect.

Figure 9:
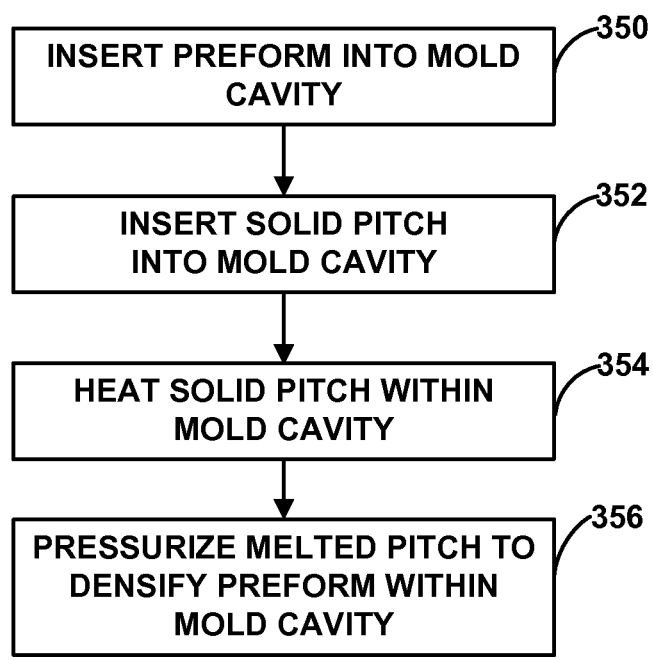
FIG. 9 is a flow diagram illustrating an example method for densifying an example article with pitch.

Different pitch densification techniques using an apparatus that includes a mold configured to receive both a material to be densified and one or more portions of solid pitch have been described in relation to FIGS. 6-8. FIG. 9 is a block diagram illustrating an example technique for densifying a material with such an apparatus. For ease of description, the technique of FIG. 9 for pitch densifying a material with an apparatus that includes a mold configured to receive both a material to be densified and a portion of solid pitch is described as executed by apparatus 300 (FIG. 6). In other examples, however, the method of FIG. 9 may be executed by apparatus 50 (FIG. 2), apparatus 100 (FIG. 3) or apparatuses with different configurations, as described herein.

As shown in FIG. 9, preform 52 may be inserted into mold cavity 55 (350) and solid pitch 302 may be inserted into mold cavity 55 (350). Once inserted, solid pitch 302 is heated to a temperature greater than a melting temperature of solid pitch 302 within mold cavity 55 (354), and preform 52 is densified within mold cavity 55 by pressurizing the melted pitch (356) to impregnate preform 52 with the melted pitch.

The technique of FIG. 9 includes inserting preform 52 into mold 54 of pitch densification apparatus 300 (350). In different examples, mold 54 may be removable from pitch densification apparatus 300 or integrally formed with pitch densification apparatus 300. Preform 52 may be a carbon-based fiber material, a carbon-based non-fiber material, or a non-carbon-based material. In some examples, preform 52 may be defined by a plurality of different layers of carbon-based fiber material that may be shaped, needled, and/or otherwise mechanically affixed together. Preform 52 may define a shape generally corresponding to a shape of a desired finished component. In one example, preform 52 may define an annular cross-sectional shape, which may generally correspond to finished brake rotor disc 36 or finished brake stator disc 38 (FIG. 1). In another example, preform 52 may define a shape generally corresponding to finished beam key 40 for securing finished brake rotor disc 36 to wheel assembly 10. In yet other examples, preform 52 may define different shapes, as will be appreciated by those of ordinary skill in the art.

Solid pitch 302 may be inserted into mold cavity 55 before inserting preform 52 into mold cavity 55, after inserting preform 52 into mold cavity 55, or both before and after inserting preform 52 into mold cavity 55. Alternatively, solid pitch 302 may be inserted into mold cavity 55 (352) at the same time preform 52 is inserted into mold cavity 55 (350). In some examples, solid pitch 302 and preform 52 may be separate materials joined into a single component, e.g., attached on a shared surface, that is inserted into mold cavity 55. In other examples, solid pitch 302 and preform 52 may be separate materials separately inserted into mold cavity 55. Solid pitch 302 may be a powder or may be a defined shape. In some examples, solid pitch 302 defines a cross-sectional shape substantially corresponding to a cross-sectional shape of mold 54. In any event, after inserting preform 52 into mold cavity 55 (350) and inserting solid pitch 302 into mold cavity 55 (352), mold cavity 55 may be sealed, e.g., by pressing a first mold portion over a second mold portion to create a bounded mold cavity 55 for pitch densifying preform 52 with melted pitch from solid pitch 302.

The technique of FIG. 9 further includes heating solid pitch 302 with heat source 308 to a temperature greater than a melting temperature of solid pitch 302. In some examples, a thermal transfer agent is conveyed through heater tubes 180 of apparatus 300 and the heat from the thermal transfer agent conductively heats solid pitch 302. In other examples, solid pitch 302 is heated with a microwave induction heater. In still other examples, solid pitch 302 is heated with a fired burner, electrical resistance heater, or other source of thermal energy. Regardless of the source of thermal energy, heat source 308 melts solid pitch 302 above a melting temperature of solid pitch 302.

Apparatus 300 is configured to densify preform 52 within mold cavity 55 by at least pressurizing the melted pitch within mold cavity 55 (356). In one example, gas source 304 applies a gas pressure in mold cavity 55 to pressurize melted pitch in mold cavity 55. The gas pressure may force the melted pitch into preform 52 to densify preform 52. In some examples, vacuum source 306 creates a vacuum pressure in mold cavity 55 at least prior to the application of the gas pressure. A vacuum pressure in mold cavity 55 at least prior to the application of the gas pressure may help draw pitch into the pores of preform 52. A vacuum pressure in mold cavity 55 at least prior to the application of the gas pressure may also help remove air from the different pores of preform 52. This may allow a lower pressure gas source 304 to be used when densifying preform 52, which may, e.g., accommodate a structurally weaker preform 52.

Used in combination, gas source 304 and vacuum source 306 may be controlled to densify preform 52 with one or more VPI cycles. In one example, vacuum source 306 creates a vacuum pressure in mold cavity 55 as solid pitch 302 is heated with heating source 308 (354). After solid pitch 302 is substantially melted, vacuum source 306 is disengaged, and pressure source 304 is used to apply a gas pressure in mold cavity 55. In this manner, apparatus 300 may densify preform 52 with melted pitch.

Examples of different pitch densification apparatuses and pitch densification techniques have been described. In different examples, techniques of the disclosure may be implemented in different hardware, software, firmware or any combination thereof In some examples, techniques of the disclosure may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, techniques of the disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various modifications of the illustrative examples, as well as additional examples consistent with the disclosure, will be apparent to persons skilled in the art upon reference to this description.

The invention claimed is:

1. A method comprising:
   inserting a material to be densified into a mold, wherein the mold is part of an apparatus including:
   a ram configured to apply a ram pressure sufficient to force a pitch into the mold to densify the material,
   a gas source configured to apply a gas pressure sufficient to force the pitch into the mold to densify the material, and
   a vacuum source operable to create a vacuum pressure in the mold at least prior to application of either the ram pressure or the gas pressure; and
   densifying the material in the mold via pitch using a selectable one of the ram, the gas source, the ram and the vacuum source, or the gas source and the vacuum source.

2. The method of claim 1, wherein the material comprises a carbon fiber material preformed into a shape of a brake disc.

3. The method of claim 1, wherein densifying the material in the mold via pitch comprises applying a ram pressure, via the ram, between approximately 500 pounds per square inch (psi) and approximately 5000 psi to force the pitch into the mold.

4. The method of claim 1, wherein the ram comprises at least one of a hydraulic ram, a pneumatic ram, or a screw ram.

5. The method of claim 1, wherein the vacuum source is configured to apply the vacuum pressure between approximately 5 torr and approximately 100 torr.

6. The method of claim 1, wherein densifying the material in the mold via pitch comprises applying, via the gas source, the gas pressure between approximately 10 pounds per square inch (psi) and approximately 1000 psi to force the pitch into the mold.

7. The method of claim 6, wherein the gas source comprises nitrogen.

8. The method of claim 6, wherein the vacuum source is configured to apply the vacuum pressure between approximately 10 torr and approximately 20 torr.

9. The method of claim 1, further comprising determining an initial density of the material, wherein the apparatus is configured to select one of the ram, the gas source, the ram and the vacuum source, or the gas source and the vacuum source to densify the material based on the determined initial density.

10. The method of claim 9, wherein the apparatus is configured to select at least one of the gas source or the gas source and the vacuum source to densify the material to be densified if the initial density is less than or equal to approximately 0.8 grams per cubic centimeter.

11. The method of claim 9, wherein the apparatus is configured to select at least one of the ram or the ram and the vacuum source to densify the material to be densified if the initial density is greater than or equal to approximately 0.8 grams per cubic centimeter.

12. A method comprising:
   inserting a material to be densified into a mold, wherein the mold is part of an apparatus including:
   a ram configured to apply a ram pressure to force a melted pitch into the mold to densify the material during at least one of a resin transfer molding cycle or a vacuum-assisted resin transfer molding cycle,
   an inert gas source configured to apply a gas pressure to force the melted pitch into the mold to densify the material during a vacuum pressure infiltration cycle, and
   a vacuum source configured to create a vacuum pressure in the mold during at least one of the vacuum-assisted resin transfer molding cycle or the vacuum pressure infiltration cycle; and
   densifying the material in the mold via pitch using a selectable one of the resin transfer molding cycle, the vacuum-assisted resin transfer molding cycle, or the vacuum pressure infiltration cycle.

13. The method of claim 12, wherein the ram comprises at least one of a hydraulic ram, a pneumatic ram, or a screw ram, and the ram pressure is between approximately 500 pounds per square inch (psi) and approximately 5000 psi.

14. The method of claim 12, wherein the inert gas source is configured to apply the vacuum pressure between approximately 5 torr and approximately 100 torr.

15. The method of claim 12, further comprising determining an initial density of the material, wherein the apparatus is configured to select one of the resin transfer molding cycle, the vacuum-assisted resin transfer molding cycle, or the vacuum pressure infiltration cycle to densify the preform based on the determined initial density.

16. The method of claim 15, wherein the apparatus is configured to select the vacuum pressure infiltration cycle if the initial density is less than approximately 0.8 grams per cubic centimeter (g/cc), the vacuum-assisted resin transfer molding cycle if the initial density is between approximately 0.8 g/cc and approximately 1.0 g/cc, and the resin transfer molding cycle if the initial density is greater than approximately 1.0 g/cc.

17. A method comprising:
   inserting a material to be densified into a mold, wherein the mold is part of an apparatus configured to densify the material using a selectable one of a resin transfer molding cycle, a vacuum-assisted resin transfer molding cycle, or a vacuum pressure infiltration cycle;
   selecting one of the resin transfer molding cycle, the vacuum-assisted resin transfer molding cycle, or the vacuum pressure infiltration cycle to densify the material in the mold; and
   densifying the material in the mold using the selected one of the resin transfer molding cycle, the vacuum-assisted resin transfer molding cycle, or the vacuum pressure infiltration cycle to densify the material to be densified.

18. The method of claim 17, further comprising determining an initial dens of the material to be densified, wherein selecting one of a resin transfer molding cycle, a vacuum-assisted resin transfer molding cycle, or a vacuum pressure infiltration cycle to densify the material to be densified comprises selecting the one of the resin transfer molding cycle, the vacuum-assisted resin transfer molding cycle, or the vacuum pressure infiltration cycle based on the determined initial density.

19. The method of claim 17, wherein the material to be densified comprises a brake disc preform, and wherein densifying the material in the mold comprises pitch densifying the material in the mold.

20. The method of claim 19, wherein pitch densifying the material in the mold comprises applying at least one of a ram pressure or an inert gas pressure to the pitch.

* * * * *

UNITED STATES PATENT AND TRADEMARK OFFICE
CERTIFICATE OF CORRECTION

PATENT NO. : 8,721,954 B2
APPLICATION NO. : 13/801229
DATED : May 13, 2014
INVENTOR(S) : Mark L. La Forest et al.

Page 1 of 1

It is certified that error appears in the above-identified patent and that said Letters Patent is hereby corrected as shown below:

IN THE CLAIMS:

Col. 34, Line 6 (Claim 18): "an initial dens of" should read --an initial density of--

Signed and Sealed this
Twelfth Day of May, 2015

Michelle K. Lee
*Director of the United States Patent and Trademark Office*